United States Patent [19]

Matsumura et al.

[11] Patent Number: 5,290,635
[45] Date of Patent: Mar. 1, 1994

[54] COLD-STRETCHED PRODUCTS COMPRISING A PROPYLENE-BASED RESIN COMPOSITION AND PROCESS FOR PRODUCING THE SAME

[75] Inventors: Disuke Matsumura; Mitsuyoshi Itada, both of Suzuka, Japan

[73] Assignee: Asahi Kasei Kogyo Kabushiki Kaisha, Osaka, Japan

[21] Appl. No.: 658,594

[22] Filed: Feb. 21, 1991

[51] Int. Cl.$^5$ .............. B32B 27/28; B32B 27/32; C08L 23/10; C08L 23/20

[52] U.S. Cl. .................. 428/516; 428/518; 428/339; 525/240; 525/210; 524/528; 524/518

[58] Field of Search ............... 428/516; 525/240, 210

[56] References Cited

U.S. PATENT DOCUMENTS

| | | | |
|---|---|---|---|
| 3,634,553 | 1/1972 | Foglia et al. | 260/897 |
| 3,808,304 | 4/1974 | Schirmer | 264/289 |
| 3,891,008 | 6/1975 | D'Entremont | 428/516 |
| 3,900,534 | 8/1975 | Schard | 260/897 |
| 4,188,350 | 2/1980 | Vicik et al. | 428/516 |
| 4,196,240 | 4/1980 | Lustig et al. | 428/516 |
| 4,230,767 | 10/1980 | Isaka et al. | 428/516 |
| 4,275,119 | 6/1981 | Weiner | 428/516 |
| 4,379,888 | 4/1983 | Yoshimura et al. | 525/240 |
| 4,391,862 | 7/1983 | Bornstein et al. | 428/516 |
| 4,528,220 | 7/1985 | Hwo | 428/516 |
| 4,766,178 | 8/1988 | Hwo | 525/240 |

FOREIGN PATENT DOCUMENTS

| | | |
|---|---|---|
| 0145014 | 6/1985 | European Pat. Off. |
| 184324 | 6/1986 | European Pat. Off. |
| 0282282 | 9/1988 | European Pat. Off. |
| 0343647 | 11/1989 | European Pat. Off. |
| 2525956 | 4/1983 | France |
| 56-005842 | 1/1981 | Japan |
| 58-823724 | 10/1983 | Japan |
| 1-063713 | 1/1989 | Japan |
| 2204048A | 11/1988 | United Kingdom |

*Primary Examiner*—Carman J. Seccuro, Jr.
*Attorney, Agent, or Firm*—Armstrong, Westerman, Hattori, McLeland & Naughton

[57] ABSTRACT

Cold-stretched products comprising a propylene-based resin composition obtained by mixing (A) a polymer consisting mainly of propylene units, in a proportion of not more than 92% by weight and not less than 50% by weight, (B) a polymer consisting mainly of butene-1 units or an ethylene-α-olefin copolymer having a softening point of 95° C. or lower, in a proportion of not more than 47% by weight and not less than 5% by weight, (C) a tackifier in a proportion of not more than 25% by weight and not less than 3% by weight, the sum of the proportions being 100% by weight; and a process for producing said cold-stretched products.

3 Claims, 5 Drawing Sheets

COLD-STRETCHED PRODUCTS COMPRISING A PROPYLENE-BASED RESIN COMPOSITION AND PROCESS FOR PRODUCING THE SAME

BACKGROUND OF THE INVENTION

1. Field of the Invention

The present invention relates to stretched products comprising a propylene-based resin composition excellent in cold-stretchability and which have a low degree of dimensional nonuniformity and a high low-temperature shrinkability, and a process for producing the stretched products.

2. Related Art

Currently, in the case of shrinkable plastics, a stretched product which shrinks at a low temperature is desirable from the viewpoint of energy savings, improvement of safety in work environments, etc. In the present invention, the term "stretched products" is used to denote products including not only flat films and sheets obtained by stretching but also various products of a non-flat shape in a stretched state obtained by molding or the like. In particular, heat-shrinkable films and sheets are advantageous in that they prevent their contents from being changed in quality by heat, and hence there has been a growing demand for such materials which shrink at low temperatures. In shrink packaging, as the shrinkage percentage is increased, the temperature at which sufficient shrinkage can be attained is lowered, and a wrinkle-free beautiful package can be obtained more easily.

In the field of packaging films and sheets, because of the demand for higher-speed automatic packaging, packaging films and sheets each having a uniform thickness and a good flatness are required. Also, in the case of printing machines, bag making machines and molding machines, there is a growing demand for improved efficiency. Particularly in the field of films, rapid and secure sealing by means of a high-speed packaging machine is required, and therefore nonuniformity in thickness of a film or sheet itself becomes a cause of the nonuniformity of sealing capability. When a film or sheet having an insufficient flatness is sent out at a high speed during printing or bag making, bending and sagging occur, so that high-speed printing or bag making cannot be achieved.

Propylene-based resins have a relatively high melting point, a high heat resistance and a high oil resistance and hence are desirable as materials for resin compositions for packaging of oil-containing substances, which compositions are to be heated.

On the other hand, since ethylene-based resins such as ethylene-vinyl acetate copolymers have a low melting point, they permit lowering of the stretching temperature and can give a stretched product having a good low-temperature shrinkability. These resins, however, are poor in heat resistance and oil resistance. That is, packaging materials obtained from them cannot withstand heat sterilization at 90° C. or higher and cannot withstand cooking of an oil-containing substance packaged using the packaging materials.

A technique of stretching a propylene-based resin at a high temperature near its melting point to cause orientation is well known. As packaging films having a propylene-based resin layer, there are known monolayer films comprising a mixed composition of propylene-based resins and various composite laminated films. Also well known are films of compositions obtained by mixing a propylene-based resin with a tackifier. However, although the compositions used therein have a high heat resistance because of their melting point being higher than that of ethylene-based resins, they are poor in cold-stretchability and hence require stretching at a high temperature of 100° C. or higher.

Also well known are oriented films of compositions obtained by mixing a propylene-based resin with a polybutene resin, but the cold-stretchability of the compositions used therein is not sufficient and the oriented films do not have a thickness precision sufficient for their use in a present-day high-speed machine and moreover are not satisfactory in low-temperature shrinkability.

On the other hand, it has also been attempted to laminate a proplene-based resin layer on a resin having an excellent cold-stretchability and cold-stretch them together.

For example, Jap. Pat. Pub. No. 48-21354 discloses a monolayer film obtained by stretching a mixed composition of a propylene-based resin, a petroleum resin and an anti-blocking agent at 135° to 160° C.

Jap. Pat. Appln. Kokai (Laid-Open) No. 47-34565 (corresponding to U.S. Pat. No. 3,741,253) discloses a laminated film obtained by laminating a vinylidene-chloride-based resin layer on a crosslinked EVA base layer (an inner seal layer), further laminating thereon a layer (an outer surface layer) of a mixed composition of a polypropylene resin, a polybutene-1 resin and an atactic polypropylene resin, and stretching the three layers with heating at about 88° C.

The specification of U.S. Pat. No. 3,808,304 discloses a film obtained by stretching a monolayer film of a mixed composition of a polypropylene resin and a polybutene-1 resin with heating at approximately 82°–110° C.

The specification of U.S. Pat. No. 3,832,270 discloses a laminated film obtained by stretching with heating at 98°–100° C. and which comprises three layers, i.e., a crosslinked EVA base layer (an inner seal layer) and two layers (outer surface layers) of a mixed composition of a polypropylene resin, a polybutene-1 resin and an atactic polypropylene resin.

Jap. Pat. Appln. Kokai (Laid-Open) No. 54-92895 discloses a laminated film obtained by stretching with heating at 130° C. and which comprises two layers, i.e., a base layer formed of a mixture of a polypropylene resin and a low-molecular-weight resin (e.g., a petroleum resin) and a layer of a mixed composition of a polypropylene resin and a polybutene-1 resin.

Jap. Pat. Appln. Kokai (Laid-Open) No. 54-106585 (corresponding to of U.S. Pat. No. 4,230,767) discloses a laminated film obtained by stretching with heating at 130° C. and which comprises three layers, i.e., a base layer of a resin composition composed mainly of a polypropylene type polymer and two surface layers of a mixed composition of an ethylene-propylene copolymer, a butene-1-based copolymer and a low-molecular-weight resin(a low-molecular-weight polypropylene or a low-molecular-weight polyethylene).

Jap. Pat. Appln. Kokai (Laid-Open) No. 57-15958 discloses a laminated film obtained by stretching with heating at 70°–130° C. and which comprises three layers, i.e., a base layer of a mixture of a propylene-based polymer and a butene-1-based polymer and two surface layers of an olefin resin (e.g. a propylene-butene-1 copolymer) gaving a melting point of 150° C. or lower.

Jap. Pat. Appln. Kokai (Laid-Open) No. 58-11147 (corresponding to U.S. Pat. No. 4,391,862) discloses a laminated film obtained by stretching with heating at about 88° C. and which comprises four layers, i.e., a crosslinked EVA base layer, a barrier layer and two outer layers of a mixed composition of a polypropylene resin and a polybutene-1 resin.

Jap. Pat. Appln. Kokai (Laid-Open) No. 60-79932 (corresponding to U.S. Pat. No. 4,619,859) discloses a laminated film obtained by stretching with heating at 45° C. and which comprises five layers, namely, a core layer of a mixed composition of a polypropylene resin and a polybutene-1 resin, intermediate layers as base layers on both sides thereof which are formed of a mixed composition very excellent in cold-stretchability composed mainly of an ethylene-vinyl acetate copolymer, and two surface layers formed of an ethylene-vinyl acetate copolymer.

However, the propylene-based resin compositions described in these references can give stretched products good in thickness uniformity only on stretching at a high temperature of about 100° C. or higher and permit cold stretching only when they are laminated on a base layer formed of another composition excellent in cold-stretchability. Thus, the propylene-based resin compositions themselves do not have a satisfactory cold-stretchability.

That is, the propylene-based resin compositions poor in cold-stretchability are insufficient in low-temperature shrinkability, and products obtained by forming the propylene-based resin composition into a laminate and cold-stretching the laminate, have not been sufficient in thickness uniformity and do not have desired performance characteristics. In other words, for satisfactory cold stretching of the laminate, the thickness of the propylene-based resin poor in stretchability should be reduced, and therefore a desired heat resistance of the whole laminate film has been unattainable. For obtaining a film in which all layers constituting the multiple layers of the film have been stretched to a high degree, the propylene-based resin compositions have been disadvantageous, for example, as follows. Since different stretching conditions should be employed for different resins constituting the layers, undesirable phenomena such as thickness non-uniformity, streaks, punctures and whitening occur during stretching, and the resulting film has an insufficient low-temperature shrinkage percentage. Moreover, when the film is subjected to free shrinkage at a high temperature at which sufficient shrinkage can be attained, a propylene-based resin layer having a small shrinkage percentage becomes wavy and the film after shrinking shows whitening.

In addition, when a film having a high degree of thickness nonuniformity obtained by forced cold stretching of the propylene-based resin is wound round a bobbin, the wound film is uneven, and the film becomes insufficient in flatness, is poor in machinability in a sending-out step in bag making, printing or the like, and produces nonuniform sealing strength in a high-speed automatic packaging machine or the like.

SUMMARY AND OBJECT OF THE INVENTION

A object of the present invention is to provide a stretched product, for example, a film or sheets, excellent in low-temperature shrinkability and dimensional uniformity such as thickness and which is obtained by cold stretching of a propylene-based resin composition superior to conventional materials in cold-stretchability. Use of these films or sheets for shrink packaging permits attainment of excellent machinability during high-speed operation and beautiful packaging.

A further object of the present invention is to provide a barrier material for packaging having a propylene-based resin layer which is excellent in heat resistance, oil resistance and low-temperature shrinkability. When this material is used for shrink packaging, the contents can be sterilized by boiling and stored for a long period of time, and the packaged contents can be cooked as is.

A still further object of the present invention is to provide a barrier material form packaging having a crosslinked layer and a propylene-based resin layer which is excellent in heat resistance, oil resistance and low-temperature shrinkability. This material permits more reliable vacuum packaging than do conventional films in present-day high-speed packaging machines.

Means employed for achieving the above objects in the present invention are as follows.

The present invention is directed to a product comprising a composition obtained by mixing (A) a polymer consisting mainly of propylene units, in a proportion of not more than 92% by weight and not less than 50% by weight, (B) a polymer consisting mainly of butene-1 units or an ethylene-$\alpha$-olefin copolymer having a softening point of 95° C. or lower, in a proportion of not more than 47% by weight and not less than 5% by weight, and (C) a tackifier in a proportion of not more than 25% by weight and not less than 3% by weight, the sum of the proportions being 100% by weight; a gas-carrier multilayer film for packaging obtained by using said cold-stretched product as an inner seal layer; and processes for producing the cold-stretched product and gas-barrier multilayer film: said product being cold-stretched.

The stretched product of this invention comprises the above mixed composition as its main constituent and may contain other additives (e.g., anti-oxidants, lubricants, anti-blocking agents and nucleating agents). It may also contain other resins so long as the effects of the present invention can be obtained.

In the present specification, the term "stretched products" is used to denote products including not only flat films and sheets obtained by stretching but also various products of a non-flat shape in a stretched state obtained by molding or the like. The term "cold-stretched products" is defined as stretched products having an orientation in a low temperature range corresponding to the cold stretching hereinafter described. The cold-stretched products include products which are obtained by forming an unstretched composition of the present invention into a non-flat shape such as a curved shape at a low temperature and are then used for packaging, coating, tightening, etc. of goods by taking advantage of the low-temperature shrinkability of the products.

DETAILED DESCRIPTION OF PREFERRED EMBODIMENTS

The present invention is explained below in detail with reference to the drawings and the like.

In the description given hereinafter, the term "resin(A)" means a resin within the scope of the polymer described in (A) above; the term "resin (B)" means a resin within the scope of the polymer or copolymer described in (B) above; and the term "resin(C)" means a resin within the scope of the tackifier described in (C) above. The term "propylene-based resin" means a polymer consisting mainly of propylene units, and the term "butene-1-based resin" means a polymer consisting mainly of butene-1 units.

The main aspect of the present invention is the cold-stretched product of the above composition. The reason why said composition is necessary is clearly shown in FIG. 1 and described in Example Comparative Example 1 in detail. An analytical method for judging the stretchability of a composition from FIG. 1 is described below.

Figure 1:
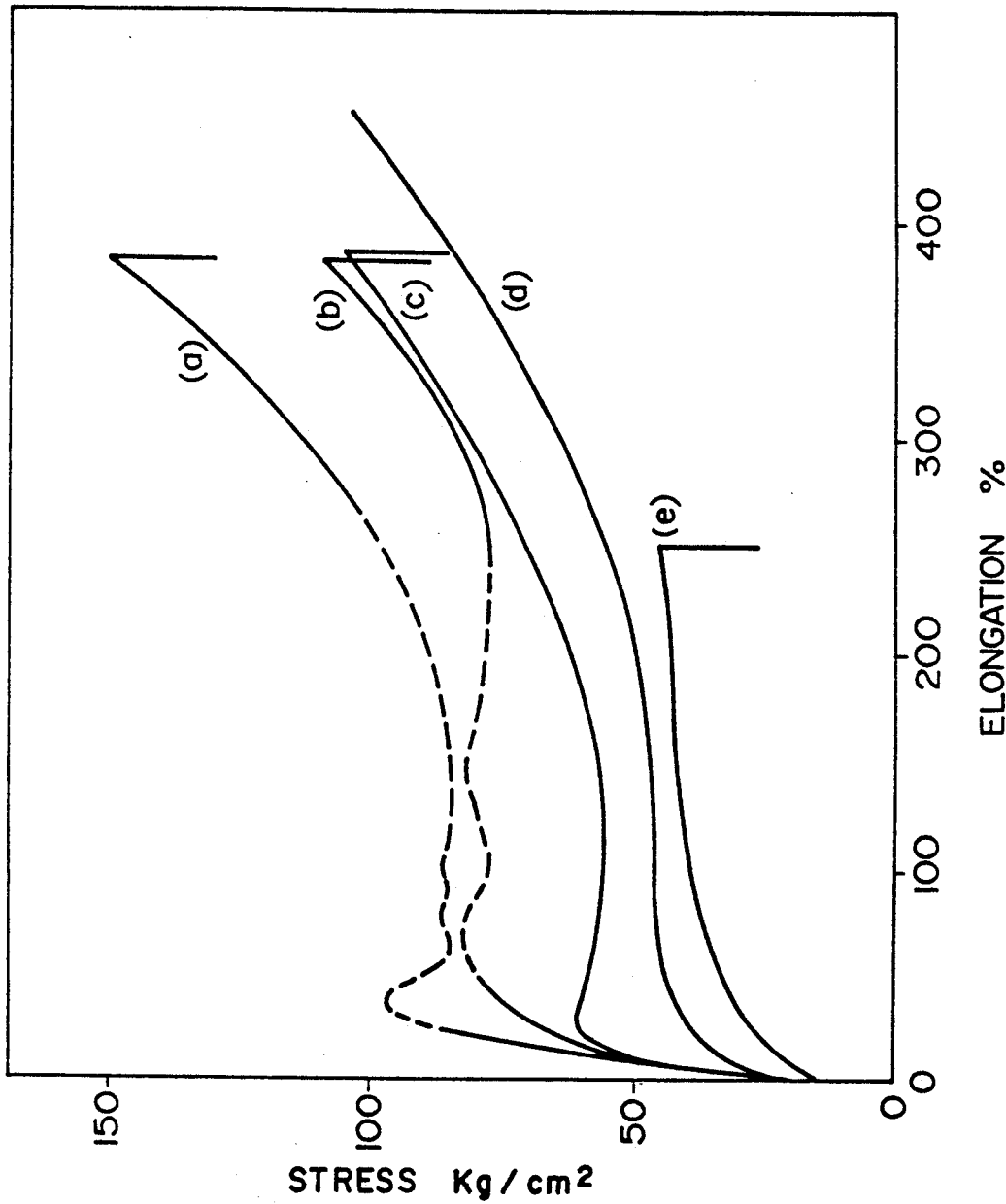
FIG. 1 shows biaxial-stretching S—S curves measured by means of a stretcher.

FIG. 1 shows stress-strain curves (hereinafter abbreviated as "S—S curves") in the case of conducting cold biaxial stretching. The abscissa represents stretching strain and the ordinate represents force (stress) required for the stretching strain. The stretching temperature is relatively low (55° C.) even in cold stretching. Of the curves, the curve ⓓ obtained for a ternary mixed composition prepared according to the present invention. The curve ⓑ and ⓒ are obtained for binary blends of resins (A) and (B), i.e., the cold-stretched compositions described in the prior art [Jap. Pat. Appln. Kokai (Laid-Open) NO. 60-79932 (corresponding to U.S. Pat/ No. 4,619,859)], namely, mixed compositions of a propylene-based resin and a butene-1-based resin.

In the case of the curve ⓐ, there is a large yield value, the stress at the beginning of stretching is high, the curve is unstable before and after the yield value and varies each time measurement is carried out, and breakage of the film is caused before 400% elongation.

On the other hand, in the case of the curve ⓓ obtained for the ternary mixed composition of the present invention, there is no yield value at all, the stress at the beginning of stretching is low, the curve is stable, and the elongation at break exceeds 400%.

Differences between the curves ⓐ and ⓑ are selected with respect to four factors, i.e., the intensity of stress at the beginning of stretching, the existence of a yield value or its magnitude, the stability of the relationship between stress at the time of stretching and elongation (the stability of the S—S curve), and elongation at break, and the relationship between these four factors and the suitability for stretching of compositions is explained below. Table 3 shows an evaluation of the four factors from the viewpoint of stretchability. The ternary blend according to the present invention shows an ideal S—S curve which does not appear to be that of a propylene-based resin, indicating that it possesses markedly improved cold-stretchability.

In detail, when the stress at the beginning of stretching is high, stretching by a tubular film process requires air introduction (blowing up) under high pressure at the beginning of stretching and rapid control of operations. Therefore, the procedure is difficult and a puncture tends to occur during the blowing up. In the case of a tenter method, since stress on the chucks is increased, a film slips out of the chucks, or when the film is strongly held with the chucks in order to prevent it from slipping out of the chucks, the thickness of the chucked portions of the film is decreased, so that there tends to occur breaks by the chucks (breakage of portions of the films around the chucks). Also, when other shaping methods are employed, it is preferable that shaping can be initiated by use of a small force. Thus, when the initial stress is low, initial stretching is easy, so that stretching can easily be achieved.

In the curve ⓐ in FIG. 1, the term "yield value" means the relatively sharp stress peak in the vicinity of 40% elongation. During stretching, a composition having such a yield value undergoes a phenomenon that a portion stretchable in spite of the yield value and a portion only slightly stretchable owing to the yield value are stretched in a mixed state. Therefore, it is difficult to stretch the film uniformly. Actually, a sheet before stretching inevitably has a thickness nonuniformity to some degree. When a sheet which is nonuniform in thickness and having a yield value is stretched, its originally thin portion is stretched in spite of the yield value, but its originally thick portion remains thick because no stress exceeding the yield value is applied thereto. Consequently, the original thickness nonuniformity is increased. Thus, the existence of a yield value and its magnitude greatly affect the stretchability of a film and the thickness nonuniformity thereof after stretching, and no uniformity in thickness can be expected in an oriented film obtained from a composition having a high yield value. That is, only an oriented film having a high degree of thickness nonuniformity can be obtained from a composition which shows the curve ⓐ in FIG. 1.

The terminology "stability of S—S curve" means whether a wavy portion such as shown by the broken line in curve ⓐ in FIG. 1 exists or not. This portion showed a different waviness each time measurement was carried out. In this case, during stretching there was visually observed a phenomenon that the composition was stretched while leaving a portion that was essentially unstretched (necking). This unstable state is often observed in a composition having a high yield value. In the case of a composition showing such an unstable S—S curve, a continuous stretching process is unstable, a film is often broken during stretching, and the thickness nonuniformity of the film after stretching is great. Therefore, such a composition is not desirable.

The terminology "elongation at break" means the value of elongation at which a film becomes unable to withstand biaxial stretching and is broken. Needless to say, for obtaining an oriented film using 4-fold stretching, a elongation at break of 4 times or more (300% or more) is necessary. Accordingly as the elongation at break becomes larger than 300%, the risk of film break is reduced. For example, in the case of stretching by a tubular film process, the risk of puncture is reduced and stable stretching can be conducted.

In the present specification, the terminology "cold stretching" means stretching at a temperature not higher than the melting point of the resin to be stretched. Specifically, in the case of propylene-based resins, cold stretching is defined as stretching at a temperature of from 30° C. to 100° C. When a higher low-temperature shrinkability is required, stretching at 85° C. or lower is preferable.

In addition, stretching temperature and orientation are described below. A temperature at which a resin is stretched is generally called the "stretching temperature." When the temperature is kept constant from the beginning of stretching to its termination, a single temperature can be determined as the stretching temperature. But, in many industrial processes, stretching is conducted while varying the temperature of the resin. For example, in biaxial stretching by a tubular film process, a cylindrical portion before stretching is heated at a definite temperature, after which a gas or a liquid is introduced into the portion, followed by bubble stretching. To keep the bubble in a stable cylindrical shape, there is generally employed a method in which the elongation of the resin is stopped by cooling the vicinity of the shoulder of the bubble or its frost line to set the resin. Biaxial stretching by means of a tenter or rollers includes sequential biaxial stretching, simultaneous biaxial stretching, etc. In the sequential biaxial stretching, in particular, the temperatures of the resin in the first stretching step and the second stretching step are often different. There are several processes comprising, in addition to such stretching steps, a step of conducting multi-stage stretching at various temperatures, a step of heat treatment (heat setting) without relaxing the film, or a step of heat setting while relaxing the film a little.

Figure 5:
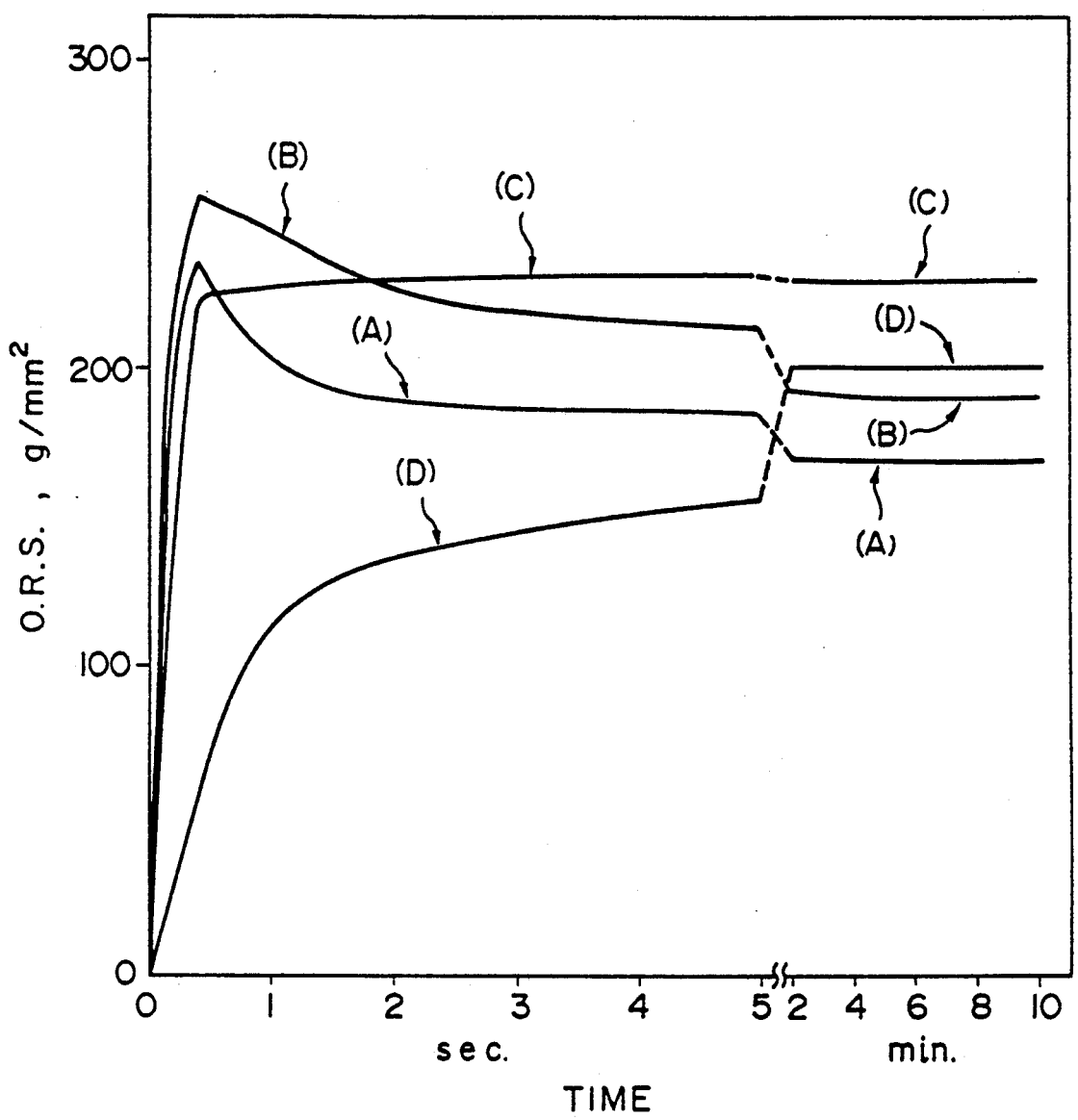
FIG. 5 shows curves which illustrate the rate of production of orientation release stress in oriented films.

Thus, in most cases, the stretching temperature cannot be simply specified. The present inventor found a method by which films obtained by the above various methods can be characterized in terms of orientation temperature without exception. The essence of this method is described in Example 1. When the orientation temperature of a film is defined as the temperature at which orientation release stress does not decrease for several seconds to several minutes, the orientation temperature of the film obtained by stretching at a constant temperature in a specific system agrees with its stretching temperature. FIG. 5 shows the change of produced orientation release stress with the elapse of time. In FIG. 5, the curve Ⓒ show the change of orientation release stress with the elapse of time measured at the same temperature as the stretching temperature.

In general, the relation described above applies to compositions composed mainly of an olefin resin having a rapid crystallization rate (e.g., an ethylene-based resin or a propylene-based resin) or a noncrystalline resin (e.g., a styrene-based resin). The composition of the present invention is within these categories. In general methods for stretching a polymer, since stretching is conducted at a rate of the order of a second, components having a short relaxation time in the order of less than a second are relaxed at the stretching temperature, and components having a longer relaxation time are cooled after stretching to undergo orientation. Stress produced by reheating of the polymer owing to the orientation is orientation release stress. An actual polymer is an aggregate of components which vary in relaxation time. When the polymer is stretched or set by a multi-stage process, the influence of the treatment carried out at the highest temperature is dominant. This is because treatments at high temperatures relax components having a short relaxation time. By determining the orientation temperature on the basis of the orientation release stress, a composition stretched through any process can be assumed to have been stretched at a constant temperature in a specific system. In the curves Ⓐ and Ⓑ in FIG. 5, since the measuring temperature of orientation release stress is higher than the stretching temperature, the relaxation time of components to be orientation is shifted to the short time side, so that orientation release stress reaches its maximum value in a short time and then drops.

In addition, when a resin having a slow crystallization rate (e.g., PVCD) is stretched while suppressing crystallization (when the resin is stretched in a state in which crystallization is suppressed by rapid cooling), the stretching is carried out while forming oriented crystals due to the stretching. Therefore, the orientation temperature defined above is higher than the stretching temperature, and the stretching temperature cannot be estimated directly by measuring the orientation release stress.

When subjected to high-temperature stretching at about 100° C. or higher, the composition according to the present invention is stretched with melting of resin crystals to some degree, so that a flow of molecules of the resins is caused. But when subjected to cold stretching, said composition is stretched without melting of the resins and hence is stretched in a state in which molecules of each resin are joined to one another. Therefore, the amount of flow of the molecules is relatively small, so that a high degree of orientation can be given to the resins. Consequently, a high heat shrinkage percentage and a high orientation release stress can be attained at a lower temperature, and the higher the degree of orientation becomes, the higher the strength that can be attained.

In general, for estimating stretchability, a stress-strain curve (an S—S curve) in the case of uniaxial stretching is measured.

However, from this measurement it is often difficult to judge the suitability for biaxial stretching by a tubular film process or an industrial tenter method.

For example, when subjected to biaxial stretching, an ethylene-vinyl acetate copolymer having a vinyl acetate content of about 15% by weight is not broken at approximately 30°-50° C. before its biaxial elongation reaches 3×3. But, at approximately 60°-100° C., it is broken before its elongation reaches 3×3. At a temperature of higher than about 100° C., biaxial stretching to an elongation of 3×3 becomes possible.

The strange behavior described above cannot be explained from the behavior of elongation during uniaxial stretching. That is, in the measurement in the case of uniaxial stretching, the elongation at break is significantly lowered at 60° C. or higher. However, in a method in which biaxial stretching is actually carried out and an S—S curve in this case is measured, said behavior can be reproduced as it is. Therefore, in the present invention, a detailed analysis of stretchability is conducted by practicing a method comprising carrying out biaxial stretching by means of a biaxial-stretcher, and measuring the S—S curve in this case.

In the present specification, as measures of stretchability, the following four dominant factors are chosen and estimated: the intensity of stress at the beginning of stretching, the existence of a yield value or its magnitude, the stability of the relationship between stress at the time of stretching and elongation (the stability of the S—S curve), and the magnitude of elongation at break.

The present inventor analyzed and investigated biaxial-stretchability by strictly analyzing the above four factors, and accomplished the present invention.

The phenomenon described with reference to FIG. 1 above was found for the first time by the present inventor, whereby the present inventor succeeded in utilizing the advantages of cold-stretchability. That is, surprisingly, the propylene-based resin composition used in the present invention has itself a good cold-stretchability.

Figure 3:
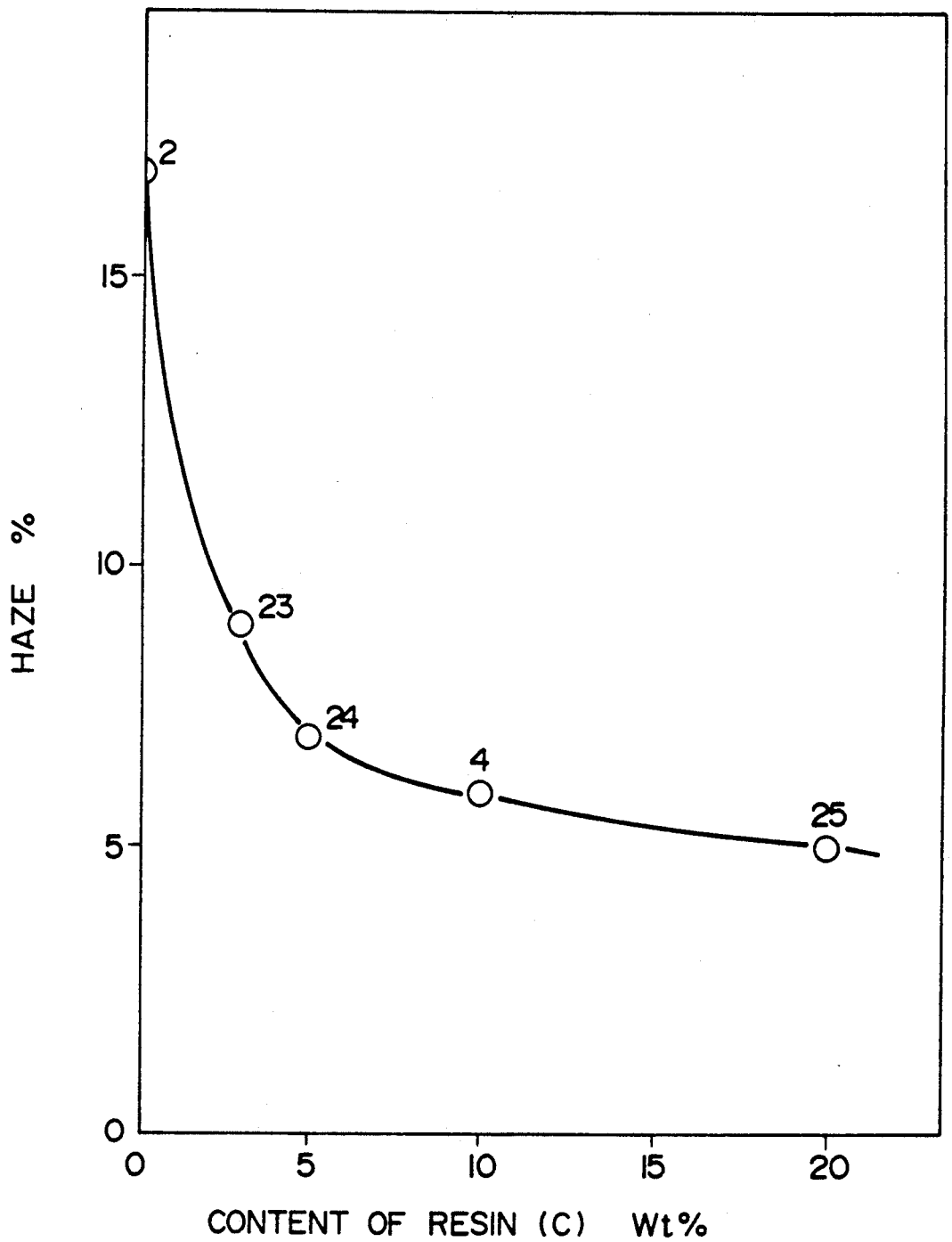
FIG. 3 is a diagram showing the relationship between transparency and the content of resin (C).

FIG. 3 shows another role of resin (C) (a tackifier) in the ternary blended composition. In detail, FIG. 3 shows the degree of transparency of a composition obtained by mixing a resin (C) with a mixed composition of a propylene-based resin and a butene-1-based resin. The ordinate represents haze: the larger the value of haze, the lower the transparency. The abscissa represents the amount of the resin (C) mixed. From FIG. 3, it can be seen that mixing of the resin (C) in a small amount of about 3% by weight improves the compatibility and the transparency.

In general, although there are few plasticizers having a good compatibility with olefin resins, it can be speculated that the resin (C) used in the present invention increases the compatibility between resin (A) and resin (B) and acts like a plasticizer to improve the stretching characteristics at low temperatures.

Resins chosen as the resins (A), (B) and (C) used in the present invention, respectively, are explained below.

Polymers consisting mainly of propylene units which are useful as the resin (A) are propylene-based resins which have a crystalline melting point of from 120° C. (inclusive) to 165° C. (inclusive) measured according to ASTMD 2117, are isotactic, have a melt flow rate (230° C., a load of 2.16 kg) of from 0.1 g/10 minutes (inclusive) to 10 g/10 minutes (inclusive) measured according to ASTMD 1238 and can be extruded alone. The terminology "consisting mainly of propylene units" means that the proportion of propylene units is more than 50% by weight. Specifically, said polymers are propylene homopolymers, propylene copolymers, or modified products thereof. The propylene copolymers are copolymers of propylene monomer and at least one monomer selected from the group consisting of ethylene and α-olefins other than propylene. The α-olefins other than propylene are unsaturated hydrocarbons having 4 to 18 carbon atoms such as butene-1, pentene-1, 4-methylpentene-1, hexene-1, heptene-1, octene-1, etc. There may be used terpolymers obtained from three or more monomers, i.e., propylene and two or more monomers selected from the group consisting of ethylene and α-olefins other than and propylene. The propylene copolymers include both random copolymers and block copolymers. Such propylene-based resins are preferably those produced while preventing contamination with atactic, low-molecular-weight propylene as much as possible by proper choice of a polymerization catalyst or removal of propylene after polymerization. The modified products include, for example, those obtained by modification with an acid (maleic acid), etc.

As the resin (A), there are preferably used the propylene copolymers, and more preferably, the propylene random copolymers.

Resins useful as resin (B) are polymers consisting mainly of butene-1 units or ethylene-α-olefin copolymers having a softening point of 95° C. or lower. The terminology "consisting mainly of butene-1 units" means that the proportion of butene-1 units is more than 50%.

The polymers consisting mainly of butene-1 units are butene-1 homopolymers, butene-1 copolymers, or modified products thereof, which have a crystalline melting point of from 70° C. (inclusive) to 125° C. (inclusive) measured according to ASTMD 2117 and a melt flow rate (230° C., a load of 2.16 kg) of from 0.1 g/10 minutes (inclusive) to 10 g/10 minutes (inclusive) measured according to ASTMD 1238, and can be extruded alone.

The butene-1 copolymers are copolymers of butene-1 monomer and at least one monomer selected from the group consisting ethylene and of α-olefins other than butene-1. The α-olefins other than butene-1 are unsaturated hydrocarbons having 3 or 5 to 18 carbon atoms, for example, propylene, pentene-1, 4-methylpentene-1, hexene-1, heptene-1 and octene-1. There may be used terpolymers obtained from three or more monomers, i.e., butene-1 and two or more monomers selected from ethylene and α-olefins other than butene-1. The butene-1 copolymers include both random copolymers and block copolymers. The modified products include, for example, those obtained by modification with an acid (maleic acid).

The ethylene α-olefins copolymers having a softening point of 95° C. or lower are copolymers consisting mainly of ethylene units. They are copolymers of ethylene monomer and at least one monomer selected from the group consisting of unsaturated hydrocarbons having 3 to 18 carbon atoms, such as propylene, butene-1, pentene-1, 4-methylpentene-1, hexene-1, heptene-1, octene-1, etc., which copolymers have a softening point of 95° C. or lower and can be extruded alone. As such copolymers, there may be exemplified elastomers having substantially no crystalline melting point (e.g., "Tafmer®", trade name of an elastomer manufactured by Mitsui Petrochemical Industries Ltd.) and very low density polyethylenes (VLDPE; sometimes referred to as ULDPE which stands for a ultra-low-density polyethylene in the field of this art) having a crystalline melting point of 110° to 125° C. (e.g., "NUC FLX®", trade name of a VLDPE manufactured by Union Carbide Corporation, "ATTANE®", trade name of a VLDPE manufactured by Dow Chemical Co., "Excellen®-VL", trade name of a VLDPE manufactured by Sumitomo Chemical Co., Ltd., and "Ultzex", trade name of a VLDPE manufactured by Mitsui Petrochemical Industries Ltd.).

As the resin (B), there are preferably used the butene-1 polymers, and more preferably, the butene-1 copolymers.

Resins useful as resin (C) are tackifiers having good compatibility with resin (A) and resin (B) and a high thermal stability during extrusion. The tackifiers useful in the present invention are petroleum resins, terpene resins or rosin resins which have a ring and ball softening point of 70° to 150° C. as measured by the test method prescribed in ASTM E 28.

The petroleum resin is obtained by subjecting to cationic polymerization a distillate containing unsaturated hydrocarbons secondarily produced by thermal decomposition of petroleum naphtha or the like. Such petroleum resins can be classified into aliphatic, aromatic, copolymer-type and alicyclic petroleum resins and coumarone-indene resins, according to the kind of constituent monomers, molecular structure, etc. The aliphatic petroleum resins are resins obtained by carrying out cationic polymerization by using components contained in $C_5$ distillate of cracked naphtha as starting materials and aluminum chloride, $BF_3$ or the like as catalyst. The aromatic resins are obtained by subjecting to cationic polymerization a $C_9$ distillate containing styrenes and indenes of cracked naphtha or pure monomers such as α-methylstyrene, β-methylstyrene, isopropenyltoluene, vinyltoluene, styrene, etc. by the use of aluminum chloride. The copolymer-type petroleum resins are obtained by subjecting to cationic polymerization a combination of $C_5$ distillate, specific components in $C_5$ distillate, $C_9$ distillate, pure monomers such as α-methylstyrene, β-methylstyrene, isopropenyltoluene, vinyltoluene, styrene, etc., and/or specific components in $C_4$ distillate by the use of aluminum chloride or the like. The coumarone-indene resins are obtained by subjecting a distillate containing indenes, styrenes and coumarones to cationic polymerization by the use of aluminum chloride or the like. The alicyclic hydrogenated petroleum resins include ①  hydrogenated products of aromatic petroleum resins, ② hydrogenated products of polymers of cyclopentadiene or its dimer, i.e., dicyclopentadiene, which are contained in $C_5$ distillate, and ③ hydrogenated products of diolefine dimers. The hydrogenated products ① include, for example, "Askon", trade name for a product manufactured by Arakawa Chemical Co., Ltd., and "Resin MBG", "Regalite" and "Regalrez ®", trade names for products manufactured by Hercules Incorporated and Rika Hercules Ltd. The hydrogenated products ② include, for example, "Escorez ®", trade name for a product manufactured by Exxon Chemical Co., Ltd. and Tonex Company Ltd.

The terpene resin is obtained by subjecting a terpene oil composed mainly of α-pinene to homopolymerization or copolymerization by the use of aluminum chloride or the like.

The rosin resin is a resin of the formula $C_{19}H_{29}COOH$ contained in colophonium or tall oil, or a derivative thereof. Useful derivatives include a products obtained by subjecting rosin to a modification such as hydrogenation, disproportionation, polymerization, dimerization, esterification, or a combination of two or more thereof.

As the resin (C), there are preferably used the hydrogenated petroleum resins, the hydrogenated terpene resins and the hydrogenated rosin resins, and more preferably, hydrogenated petroleum resins and hydrogenated terpene resins which have a bromine number of 10 cg/g or less as measured in accordance with ASTH D 1159.

Resins within the scope of resins (A), (B) and (C) are listed in Table 5 in Example Comparative Example 2 from the viewpoint of stretchability and transparency. As the resin (A), propylene-based resins are preferred, and in particular, propylene-based random copolymers are most suitable for cold stretching at a relatively low temperature (55° C.) (sample Nos. 7, 8 and 12).

As the resin (B), butene-1-based resins or ethylene-α-olefin copolymers having a softening point of 95° C. or lower are preferred, and in particular, butene-1-etylene copolymers and butene-1-α-olefin copolymers are most suitable for cold stretching at a relatively low temperature (55° C.) (sample Nos. 7, 8, 12 and 13).

As the resin (C), hydrogenated hydrocarbon resins of the petroleum type and terpene type are the most suitable (sample No. 7, 8 and 12).

The mixed composition containing an atactic polypropylene (sample No. 19) described in Jap. Pat. Pub. No. 58-43024 (corresponding to U.S. Pat. No. 3,741,253) and U.S. Pat. No. 3,832,270 is not desirable because it is poor in cold-stretchability and the surface of a resultant film becomes sticky. The mixed composition containing a low-molecular-weight polyethylene (sample No. 20) described in Jap. Pat. Appln. Kokai (Laid-Open) No. 54-106585 (corresponding to U.S. Pat. No. 4,230,767) is not desirable because it is poor in cold-stretchability.

The stretched product of the present invention may contain additives and other resins so long as they do not hinder the achievement of the objects of the present invention. Such additives and the other resins include, for example, additives such as fatty-acid-amide-based lubricants, silicone-based anti-blocking agents, anti-fogging agents, antioxidants, processing aids, coloring agents, transparency improvers, nucleating agents (e.g dibenzylidenesorbitol); ethylene-vinyl acetate copolymers (EVA), ethylene-ethyl acrylate copolymers (EEA), ethylene-methyl acrylate copolymers (EMA), ethylene-acrylic acid copolymers (EAA), ionomer resins (IR) and the like, which may be added for improving adhesion to the adjacent layer; and antibacterial ethylene-ethyl acrylate-maleic anhydride copolymers.

Figure 2:
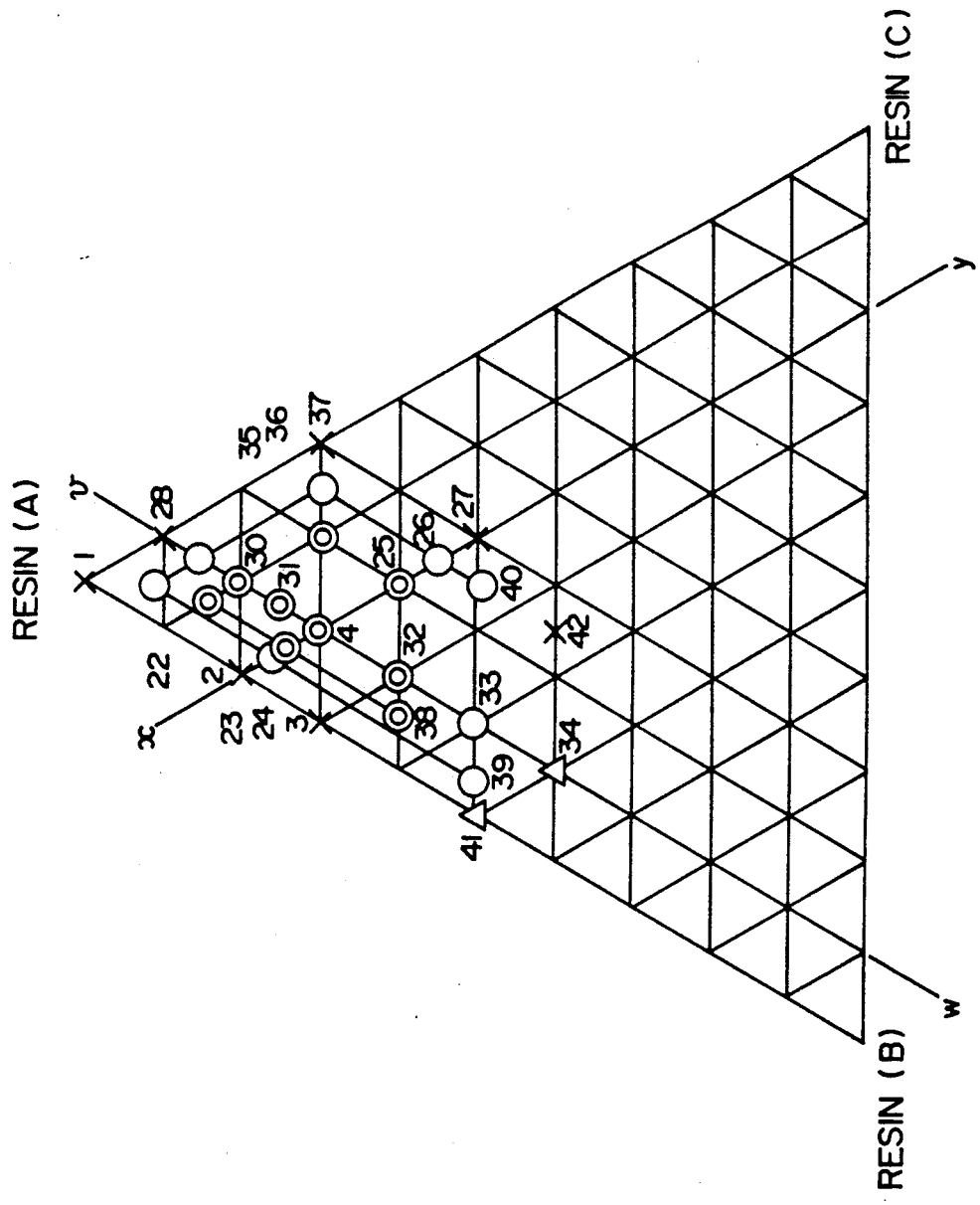
FIG. 2 is an analytical diagram showing the components of the mixed composition of which the stretched product of the present invention is composed.

FIG. 2 (corresponding to Example Comparative Example 3) is an analytical diagram in which the performance characteristics of the ternary blended composition used in the present invention are judged. In FIG. 2, the scale is as follows: at the upper vertex, the proportion of resin (A) is taken as 100% by weight; at the lower, left vertex, the proportion of resin (B) is taken as 100% by weight; and at the lower, right vertex, the proportion of resin (C) is taken as 100% by weight. The symbol representative of the comprehensive rating of performance characteristics of each ternary blended composition is plotted on coordinates corresponding to individual mixing ratios, whereby the relationship between the performance characteristics and the blending proportions is investigated. When the contents of resins (A), (B) and (C) are taken as a% by weight, b% by weight and c% by weight, respectively, the blending ratio is represented by [a, b, c]. In FIG. 2, the triangle can be divided into a range inside a trapezoid drawn by joining plots of the symbol ○ i.e., four points represented by [92, 5, 3], [50, 47, 3], [50, 25, 25] and [70, 5, 25] and a range outside the trapezoid. In short, it is revealed that a range wherein all of the desired properties in the present invention, i.e., high cold-stretchability, high transparency, and high heat resistance can be attained is inside the trapezoid. It can be seen that the range inside the trapezoid drawn by joining the plots of the symbol ○ in FIG. 2 is expressed by the words "a mixed composition comprising not more than 92% by weight and not less than 50% by weight of resin (A), not more than 47% by weight and not less than 5% by weight of resin (B) and not more than 25% by weight and not less than 3% by weight of resin (C), the sum of the proportions being 100%".

A more preferable range is a range inside a trapezoid drawn by joining the plots of the symbol ⊙ in FIG. 2, namely, a range inside a trapezoid drawn by joining four points represented by [85, 10, 5] [60, 35, 5], [60, 20, 20] and [70, 10, 20], which is expressed by the words "a mixed composition comprising not more than 85% by weight and not less than 60% by weight of resin (A), not more than 35% by weight and not less than 10% by weight of resin (B) and not more than 20% by weight and not less than 5% by weight of resin (C), the sum of the proportions being 100% by weight".

Figure 4:
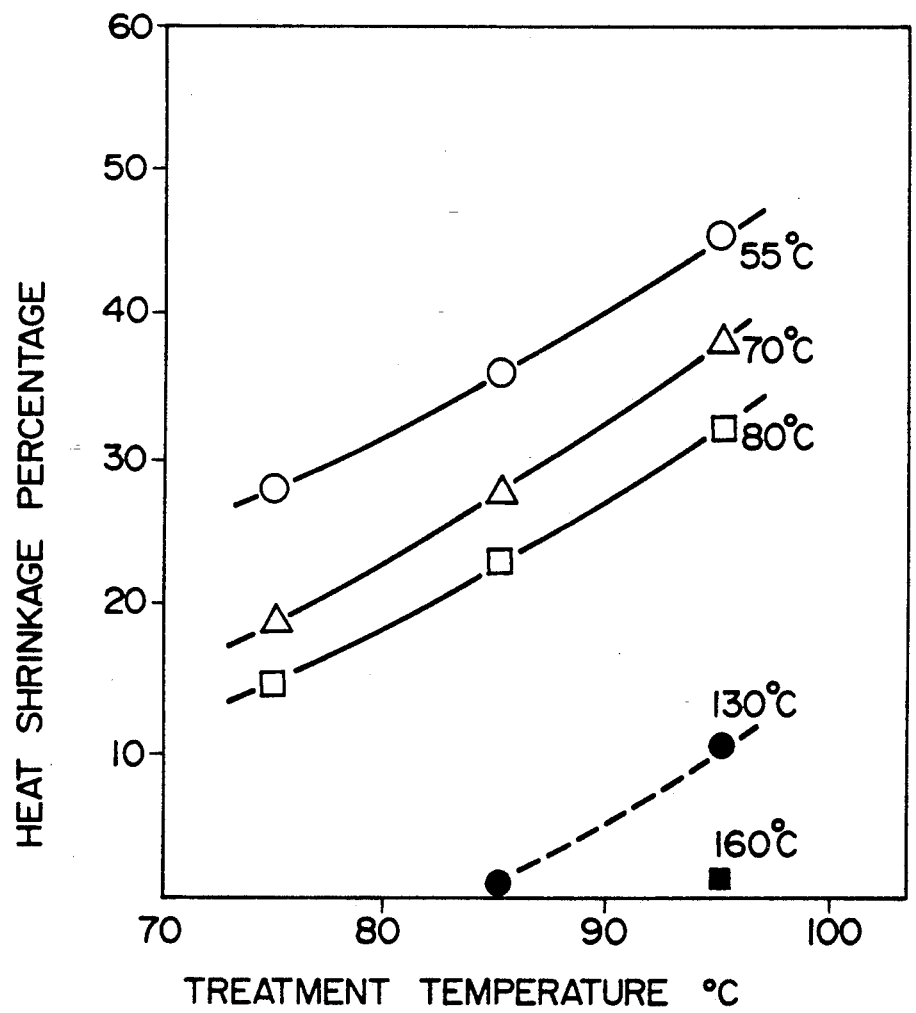
FIG. 4 is a diagram showing the relationship between the heat shrinkage percentage and shrinking temperature of a group of films obtained by different stretching methods.

FIG. 4 (corresponding to Example Comparative Example 4) shows the high performance characteristics of the oriented films obtained by cold stretching according to the present invention. The curves shown by the white symbols are obtained for the films of the present invention and the curves shown by the black symbols are obtained for conventional films produced by high-temperature stretching. The oriented films obtained by cold stretching of the present invention have a high heat shrinkage percentage at a relatively low treatment temperature of 75° C. The heat shrinkage percentage of 28% at 75° C. is very high for films of a propylene-based resin composition. Thus, the films of the present invention are useful as shrinkable films and are desirable.

Another embodiment utilizing the characteristics of the cold-stretched product of the present invention is a gas barrier laminated film for packaging obtained by using said stretched product as a seal layer in a multilayer packaging film composed of a core layer formed of a resin having gas barrier properties, at least one outer resin layer, and an inner layer formed of a resin having sealing properties. In such a film, the thickness of the seal layer comprised by the stretched product of the present invention is preferably 10% or more based on the thickness of the laminated film, preferably 4μ or more, and more preferably 6μ or more. When the thickness is less than 10% or the seal layer is thinner than 4μ, the heat resistance and oil resistance of the seal portion of the film are deteriorated. In the gas barrier layer, there can be preferably used vinylidene-chloride-based resins, ethylene-vinyl alcohol copolymer resins and various polyamide resins, but resins usable in the gas barrier layer are not limited thereto.

Tables 9-1, 9-2 and 9-3 (corresponding to Example Comparative Example 5) show the usefulness of barrier multilayer films for packaging of the present invention which are obtained by using the stretched product of the present invention as an inner layer (a layer of a resin having sealing properties). Table 10 shows the performance characteristics of these films. In these tables, the films obtained by using a seal layer comprising the stretched product of the present invention are sample Nos. 101 to 103, 105 to 106, and 109 to 111. All of these films have a high heat shrinkage percentage, are excellent particularly in low-temperature shrinkability, and have a high transparency after shrinkage and excellent uniformity of thickness. They show a low fraction defective in vacuum packaging and hence are desirable. Since a propylene-based resin having a high cold-stretchability is used in the films, the thickness proportion of the layer of the propylene-based resin relative to the thickness of each laminated film can be increased. For Example, in sample No. 106, the thickness proportion is 40%. Therefore, there can be attained heat resistance and oil resistance which are such that no problems result even when oily food is wrapped up in the film and boiled.

On the other hand, in a comparative example (sample No. 108) in which a propylene-based resin is used alone in the inner layer, the shrinkage percentage of the inner layer itself is low, so that the shrinkage percentage of the whole laminated film is also low. More interestingly, the following phenomenon was observed. Since the heat shrinkage percentage of the inner layer formed of the propylene-based resin alone was lower than that of the whole laminated film, the inner layer could not conform to the shape of the whole laminated film which was shrinking, and the inner layer became wavy during shrinkage, so that the transparency of the film after shrinkage was extremely poor. As shown in Table 9-2, stretching was impossible in the case of a laminated film (sample No. 107) in which the thickness of the inner layer composed of a propylene-based resin alone was increased to adjust the thickness proportion of the propylene resin layer to 40% based on the thickness of the laminated film. The thickness proportion of the propylene-based resin layer in the laminated film of sample No. 108 which had been unsatisfactorily stretchable was 10% based on the thickness of the laminated film.

Sample No. 112 listed in Table 9-3 is a comparative example in which a mixed composition consisting merely of a propylene-based resin and a butene-1-based resin as described in Jap. Pat. Appln. Kokai (Laid-Open) No. 60-79932 (corresponding to U.S. Pat. No. 4,619,859) is used in an innermost layer. Sample No. 113 shown in Table 9-3 is also a comparative example in which a mixed composition of a propylene-based resin, a butene-1-based resin and an atactic polypropylene resin as described in Jap. Pat. Appln, Kokai (Laid-Open) No. 47-34565 (corresponding to U.S. Pat. No 3,741,253) is used in an innermost layer. In the case of both samples, the stretchability was low and the thickness nonuniformity is serious. Thus, these samples are inferior to the films of the present invention.

A more preferable embodiment of the barrier multilayer film for packaging obtained by using the stretched product of the present invention as an inner layer (a layer of a resin having sealing properties) is such that at least one layer other than the layer of resin having sealing properties is crosslinked. Its most preferable embodiment is such that it has a crosslinked outer resin layer.

The reason is shown in Tables 12-1, 12-2, 12-3 and 12-4 (corresponding to Example Comparative Example 6). In Example Comparative Example 6, there were compared sealing temperature range of compositions in high-speed vacuum packaging by a limited number of workers. From Tables 12-1, 12-2, 12-3 and 12-4, it can be seen that preferable films which show a relatively wide sealing temperature range under severe use conditions are the barrier multilayer films for packaging of sample Nos. 103, 106 and 110 in which the stretched product of the present invention is used as an inner layer (a layer of a resin having sealing properties) and at least one layer other than the layer of a resin having sealing properties is crosslinked. A more preferable film which shows the widest sealing temperature range is the barrier multilayer film for packaging of sample No. 103 using the stretched product of the present invention as an inner layer (a layer of a resin having sealing properties) and having a crosslinked outer resin layer.

As described above, the cold-stretched products obtained according to the present invention are excellent in low-temperature shrinkability, uniformity of thickness, heat resistance and transparency and are suitable as various shrink-packaging materials.

EXAMPLES

First, evaluation methods used in the Examples and Comparative Examples are explained below.

Evaluation Method

1. Evaluation of stretchability with a biaxial-stretcher

The following evaluation method is used for evaluating the biaxial-stretchability of a resin sheet at a predetermined temperature. Stretching temperatures of 55° C. and 80° C. were employed.

① Production of unstretched sheet chips

For producing a sheet, there was used an extruder equipped with a T-die of 1 m in width and a winding unit for casting designed to cool a molten resin rapidly by means of chill rolls. First, each resin was extruded with the extruder by the use of a commercially available Dulmage screw through the die having a die gap adjusted so as to prevent draw down as much as possible. The molten resin extruded through the die was rapidly cooled by means of chill rolls at about 10° C. and an air knife having an air temperature of about 10° C. and an air flow rate of 20 m/sec to form a sheet of about 100$\mu$ in thickness, which was then wound up.

Square chips having sides of 115 mm each were cut out of a portion of the sheet which had a thickness of about 100$\mu$ and a low degree of thickness nonuniformity, with a sharp cutter. Then, their thickness was measured by means of a micrometer gauge and they were used as test pieces.

② Measuring apparatus

There was used a biaxial-stretching measuring apparatus (ordinary temperature to 200° C.) manufactured by IWAMOTO SEISAKUSHO Co., Ltd. This apparatus is designed to chuck the corners of a square test piece with four chucks, respectively, and stretch the same, and it permits simultaneous biaxial stretching. It has a sensor capable of detecting the stretching stresses in two directions individually and a stress recorder, and permits recording of an S—S curve during stretching.

③ Measuring method

This distance between the chucks at the beginning was adjusted to 100 mm in both directions. The test piece produced as described above was tightly fixed by means of the chucks of the measuring apparatus, and adjusted to a predetermined temperature by controlling the atmospheric temperature. Then, the test piece was stretched in the two directions at the same time each at a stretching rate of 50 mm/sec until the distance between the chucks became 550 mm (draw ratio: 5.5, elongation: 450%) in both directions. The stress during the stretching was recorded in the recorder in the form of an S—S curve in each direction. The measurement was repeated 10 times for each sample. The experiment was carried out while observing the state of the sample visually and carefully, and there were recorded the test pieces coming out of the chucks and breaking of the stretched film.

④ Data processing

The average of the data from all of the 10 measurements obtained in each of the two directions was calculated, whereby an average S—S curve was obtained. When the S—S curve obtained had a yield value, the yield stress was taken as Y and the minimum stress after the yield value as L, and Y/L was calculated. When the S—S curve was wavy after the yield value, and showed a considerable scatter of measured values, the wavy portion of the curve was shown by a broken line. On the basis of the results thus obtained, the following rating was conducted:

1) Initial stress

A maximum stress required for elongation from 0% to 50% was measured. The rating (symbol) shown hereinafter was as follows:

○: A maximum stress of less than 50 kg/cm$^2$.
Δ: A maximum stress of less than 75 kg/cm$^2$ and not less than 50 kg/cm$^2$.
X: A maximum stress of not less than 75 kg/cm$^2$.

2) Yield value

The existence and magnitude of a yield value were investigated. The rating (symbol) shown hereinafter was as follows:

○: No yield value.
Δ: A yield value existed. Y/L was not more than 1.1.
X: A yield value existed. Y/L was more than 1.1

3) Stability of S—S curve

The stability of the S—S curve was examined. The rating (symbol) shown hereinafter was as follows:

○: The S—S curve was not wavy.
X: The S—S curve was wavy and showed a considerable scatter of measured values.

4) Elongation at break

The elongation at which a film was broken was measured as elongation at break. When the film cam out of the chucks, the measurement was redone. The average value of elongation at break was calculated. The rating (symbol) shown hereinafter was as follows:

○: An elongation at break of not less than 400%.
Δ: An elongation at break at less than 400% and not less than 300%.
X: An elongation at break of less than 300%

5) Stretchability (comprehensive evaluation)

A comprehensive evaluation of stretchability was carried out by putting together the ratings of initial stress, yield value, stability of the S—S curve, and elongation at break. The rating (symbol) shown hereinafter was as follows:

⊙: ○ in all of the four items.
○: No X. Δ in one item and ○ in three items.
Δ: No X. Δ in two or more items.
X: X in at least one item.

2. Transparency

The following evaluation method shows the degree of transparency of a film.

Transparency was evaluated by measuring the haze of a predetermined test piece in accordance with the measuring method prescribed in ASTM D 1003.

① When either a cast sheet of about 100$\mu$ in thickness or an oriented film subjected to heat shrinkage was used as a sample, the rating (symbol) shown hereinafter was follows:

⊙: A haze value of less than 7%.
○: A haze value of less than 10% and not less than 7%.
Δ: A haze value of less than 15% and not less than 10%.
x: A haze value of not less than 15%.

② When an oriented film of approximately 45–65$\mu$ in thickness was used as a sample, the rating (symbol) shown hereinafter was follows:

⊙: A haze value of less than 6%.
○: A haze value of less than 8% and not less than 6%.
Δ: A haze value of less than 10% and not less than 8%.
x: A haze value of not less than 10%.

③ When an oriented film of approximately 8–12$\mu$ in thickness was used as a sample, the rating (symbol) shown hereinafter was follows:

⊙: A haze value of less than 3%.
○: A haze value of less than 5% and not less than 3%.
Δ: A haze value of less than 7% and not less than 5%.
x: A haze value of not less than 7%.

3. Heat resistance

The following method shows the degree of heat resistance of a film.

① Sample films

As samples, there were used biaxially oriented films of about 10μ in thickness obtained by biaxial stretching by a factor of 3.5×3.5 of a cast sheet of a predetermined composition having a thickness of about 120μ, at 55° C., the sheet having been produced in the same manner as that used in the evaluation of stretchability with the biaxial-stretcher and the measuring apparatus used therein. The oriented film was taken off from a stretcher by using an instrument made of an iron plate which had a square shape having sides of 30 cm each and a pressure-sensitive adhesive double-coated tape attached to each side. The instrument was previously cooled at 15° C. and pressed against the film immediately after completion of the biaxial stretching, whereby the oriented film was prevented from shrinking greatly at the time of removal.

② Measurement of heat resistance

Each sample was fixed to a metal frame having a square opening by means of a pressure-sensitive adhesive double-coated tape so as not to form wrinkles. They were then brought into a light contact with a hot, hemispherical metal plate of 50 mm in diameter adjusted to a predetermined temperature, and formation of a hole in the contacted portion was visually observed. The measurement was repeated 10 times in each temperature range while raising the temperature at steps of 10 seconds, until a hole appeared in one half of the test pieces within 1 second. A temperature at which a hole appeared in one half of the test pieces within 1 second was called the "heat resistance temperature". The rating (symbol) shown hereinafter was as follows:

⊚: A heat resistance temperature of not lower than 130° C.
○: A heat resistance temperature of lower than 130° C. and not lower than 120° C.
Δ: A heat resistance temperature of lower than 120° C. and not lower than 110° C.
x: A heat resistance temperature of lower than 110° C.

4. Heat shrinkage percentage

Four marks were put on a predetermined film sample at positions thereon corresponding to the vertexes of a square having sides of 100 mm each, at a distance of 100 mm from the adjacent mark with an oil marker. When the sample had directional qualities such as length and breadth, the marks at a distance of 100 mm from the adjacent mark were put in parallel to the lengthwise direction or the crosswise direction. A portion containing the marked square and a margin around it of about 5 cm was cut out of the film, immersed in a relaxed state in warm water at a predetermined temperature for 4 seconds to be heat-shrunk, and then cooled with tap water. Thereafter, the distance between the marks which had originally been 100 mm was measured with a scale. When the measured value was taken as x mm, the shrinkage percentage was calculated according to the following formula:

Shrinkage percentage (%)=(100−x)/100 x 100

The average of the values thus obtained was calculated, whereby the shrinkage percentage was determined.

5. Orientation release stress (O.R.S.)

The measurement method prescribed in ASTM D 1504 was employed. In the measuring apparatus, there were used a bath containing silicone oil as a heat medium in which the temperature could be uniformly controlled, chucks having a stress gauge capable of detecting stress with good response (the distance between chucks: 50 mm), and a recorder capable of recording the variation with time of the stress with good response. The chucks could be moved up and down automatically and rapidly, and stress could be recorded in the recorder by taking its value at the beginning of dipping of a sample in the heat medium as zero. First, a strip of 5 mm in width was cut out of each film and attached to the chucks without looseness. Then, the chucks were moved down automatically and quickly to be dipped in the oil bath. The time lag from dipping of the lower end of the strip of 50 mm in length held by the chucks to complete dipping of the upper end was less than 0.1 second. The stress produced was recorded by taking its value at the moment when the lower end came into contact with the heat medium, as zero.

6. Biaxial-stretchability in a tubular film process

The following evaluation method was used for evaluating the ease and stability of biaxial stretching by a tubular film process of an unstretched parison tube obtained by a predetermined method. As the parison tubes, there were used those in which the thickness had been measured to a precision of 1 μ at 16 points at equal distances in the circumferential direction by means of a dial gauge and the thickness nonuniformity had been adjusted to ±5%. Air introduction (blowing-up) was tried at least 5 times. Parison tubes which could be stretched were individually formed into a film until puncture or for at least 1 hour. The rating (symbol) shown hereinafter was as follows:

⊚: Blowing-up was easy. Blowing-up could be conducted by single air introduction without failure and thereafter stretching could be conducted for 1 hour or more without puncture.
○: Blowing-up was easy. Blowing-up could be conducted by single air introduction without failure and thereafter stretching could be conducted for less than 1 hour and not less than 15 minutes without puncture.
Δ: Blowing-up was somewhat difficult. Blowing-up could be conducted after 1 to 4 failed repetitions of air introduction. Thereafter, stretching could be conducted for less than 1 hour and not less than 15 minutes without puncture.
x: Blowing-up was difficult. Five successive repetitions of air introduction were unsuccessful, or although blowing-up could be conducted after 1 to 4 failed repetitions of air introduction, puncture occurred not more than 15 minutes after the blowing-up.

7. Uniformity of thickness

The following evaluation method was used for evaluating the uniformity of thickness of a film obtained by biaxial stretching by a tubular film process of a parison tube obtained by a predetermined method. As the parison tube, there were used those in which the thickness had been measured to a precision of 1μ at 16 point at equal distances in the circumferential direction by means of a dial gauge and the thickness nonuniformity had been adjusted to ±5%. The thickness of the film tube obtained by the stretching was measured at intervals of 5 mm in the circumferential direction. The thickness measurement was carried out to a precision of 1μ by means of a dial gauge. From the thickness data, the average thickness was calculated. The maximum thickness and the minimum thickness were picked out of the data, and the difference between each of them and the average thickness was expressed as a percentage based on the average thickness. For example, when the 5 average thickness is 50μ, the maximum thickness 55μ, and the minimum thickness 44μ, the thickness nonuniformity is +10% and −12%. The rating (symbol) shown hereinafter was as follows:

⊚: A thickness nonuniformity of less than ±10%.
○: A thickness nonuniformity of less than ±15% and not less than ±10%.
Δ: A thickness nonuniformity of less than ±20% and not less than ±15%.
x: A thickness nonuniformity of not less than ±20%

8. Analysis of the cause of defective seal

The following evaluation method was used for judging whether a seal formed by means of a vacuum packaging machine is satisfactory or not in a vacuum-packaged product obtained by a predetermined method.

In the evaluation method, the seal portion was observed visually and carefully. In the case of a vacuum packaging film container which leaked, there were employed a method comprising peeling the film container carefully from its content, and filling the same with air, immersing the same in water, and determining the defective portion(s) on the basis of the position of bubbles leaking out, and a method comprising spraying Ageless Seal Check ® (a spray of a red liquid having a good penetrability, manufactured by Mitsubishi Gas-Chemical Co., Inc.) on the inner part of the seal portion, and determining the defective portion(s) on the basis of penetration of the red liquid.

The evaluation was carried out at the following two points of time:

① Defective seal immediately after vacuum packaging and before heat shrinkage.
② Defective seal after shrinkage followed by storage for 24 hours.

Figure 6:
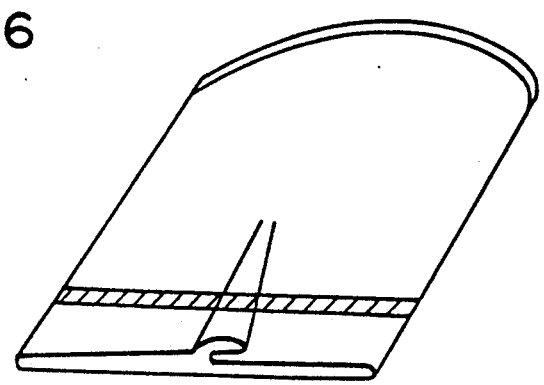
FIG. 6 is a sketch of folding in a film which is caused in a seal portion during vacuum packaging.

On analysis, the causes of a defective seal could be roughly divided into the following three groups a, b and c:

a. Causes belonging to the low heat resistance of the whole of a film.
  1. Seal break: A seal portion was broken.
  2. Seal elongation: A seal portion was elongated to a length twice as large as the width of a heater wire.
  3. Pinholes: Pinholes were formed at the edge of a seal portion by melting by heat, so that a vacuum packaging container leaked.

b. A cause belonging to the insufficient heat resistance of the outer surface of a film.
  1. Stick: The outer surface of a film was melted to be peeled off, resulting in sticking to a bar or a rubbing means.

c. A cause belonging to non-fusion of a seal.
  1. Folding: A film was folded at a seal portion, as shown in FIG. 6, and the folded portion was in a non-fused state, resulting in leakage of a vacuum packaging container.

The incidence of defect(s) belonging to each of the above groups a, b and c was calculated, relative to the total number of examined test pieces. The rating (symbol) shown hereinafter was as follows:

⊚: An incidence of defect(s) of 0%.
○: An incidence of defect(s) of not more than 3% and more than 0%.
Δ: An incidence of defect(s) of not more than 10% and more than 3%.
x: An incidence of defect(s) of more than 10%.

Definition of Terms

Hereinafter, the terminology used in the Example Comparative Examples are defined and abbreviated as follows.

1. Density
Abbreviated as d. Measured in accordance with ASTM D 1505. Expressed in g/cm$^3$.

2. Crystalline melting point
Abbreviated as Tm. Measured in accordance with ASTM D 2117. Expressed in °C.

3. Vicat softening point
Abbreviated as VSP. Measured in accordance with ASTM D 1525. Expressed in °C.

4. Melt index
Abbreviated as MI. Measured in accordance with ASTM D 1238. Expressed in g/10 min. Measurement conditions: 190° C., a load of 2.16 kg.

5. Melt flow rate
Abbreviated as MFR. Measured in accordance with ASTM D 1238. Expressed in g/10 min. Measurement conditions: 230° C., a load of 2.16 kg.

6. Weight average molecular weight
Abbreviated as Mw. Measured by GPC.

7. Number average molecular weight
Abbreviated as Mn. Measured by GPC.

8. Ring and ball softening point
Measured in accordance with ASTM E 28. Expressed in °C.

9. Dropping point
Measured in accordance with DGF-M-111 2 (71). Expressed in °C.

10. Percentage by weight
Abbreviated as wt %.

11. Bromine number
Abbreviated as BrV. Measured in accordance with ASTM D 1159. Expressed in cg/g.

The present invention is further explained by means of the following example comparative examples, which are not by way of limitation but by way of illustration, within the scope of the claims for a patent on the present invention.

Example Comparative Example 1

The present example comparative example illustrates the significance of use of a ternary blended composition of resin (A), resin (B) and resin (C) in the present invention from the viewpoint of an improvement in cold-stretchability. Using each of the compositions prepared by mixing the resins listed in Table 1 in the proportions shown in Table 2, cast sheets of about 100μ in thickness were produced by the method described above. The resins to be mixed were used after being pelletized with a twin-screw extruder having screws completely intermeshing in different directions.

Test pieces 115 mm square were cut out of each sheet, and an S—S curve at 55° C. was measured for the test pieces by means of a biaxial-stretcher by the method described above. The S—S curve obtained are shown in FIG. 1. They were classified according to the factors indicating low-temperature stretchability, by the method described above. The results obtained are shown in Table 3. In the case of the curve shown by the symbol ⓐ in FIG. 1, the terminology "yield value" used in Table 3 means the height of the relatively sharp stress peak in the vicinity of an elongation of 40%. On the other hand, the curve ⓓ has no stress peak. In the case of the curve ⓐ, the terminology "initial stress"

means the stress peak value (yield stress) in the vicinity of an elongation of 40%. In the case of the curve ⓓ, since it has no peak value, the terminology "initial stress" means a height of stress value corresponding to an elongation of 50%. The terminology "stability of S—S curve" means whether a wavy portion such as shown by the broken line in the curve ⓐ is present or not. This portion showed a different wavy form each time measurement was carried out, and a phenomenon (necking) where the test piece was stretched while leaving a virtually unstretched portion was observed by visual observation of the state of the film during stretching. In FIG. 1, occurrence of elongation at break is shown by a vertical line. In curve ⓐ, the occurrence is shown by a vertical line at an elongation of 380%. At this point, the oriented film was broken. In the case of the curve ⓓ, the oriented film was not broken even by 5.5-fold stretching (450% elongation).

The transparency of the cast sheets were also evaluated by the method described above. The results obtained are shown in Table 3.

As shown in FIG. 1 and Table 3, a propylene-based resin (sample No. 1) has a high yield value, an unstable S—S curve, an insufficient elongation and a low cold-stretchability. Blends of the propylene-based resin and a butene-1-based resin (sample Nos. 2 and 3) have a somewhat improved but insufficient cold-stretchability and a transparency significantly lower that of the propylene-based resin itself. On the other hand, a blend of the propylene-based resin, the butene-1-based resin and a tackifier (sample No. 4) is excellent in both cold-stretchability and transparency and hence desirable.

The same blend as used in sample No. 4 except that an ethylene-based resin is used as the base resin in place of the propylene-based resin has an insufficient elongation and a low cold-stretchability.

From the above results, it can be seen that the composition comprising the propylene-based resin as the main constituent, the butene-1-based resin and the hydrogenated petroleum resin has excellent cold-stretchability and transparency.

TABLE 1

| Abbreviation Note (1) | Resin Composition |
|---|---|
| A 1 | Propylene-based random copolymer d: 0.90 g/cm³, Tm: 136° C., VSP: 130° C., MFR: 7 |
| A 2 | Ethylene-4-methylpentene-1-copolymer d: 0.92 g/cm³, Tm: 122° C., VSP: 100° C., MI: 2 |
| B 1 | Butene-1-ethylene copolymer (ethylene content: 6 wt %) d: 0.90 g/cm³, Tm: 100° C., VSP: 70° C., MI: 0.2 |
| C 1 | Acyclic saturated hydrocarbon resin d: 1.00 g/cm³, Mw: 820, Ring and ball softening point: 125° C., BrV: Ca. 3 |

Note (1):
A 1: Chisso Polypro ® FM-821, manufactured by Chisso Petrochemical Ltd.
A 2: A liner low density polyethylene (sometimes hereinafter referred to as LLDPE), Ultzex ® 2020L, manufactured by Mitsui Petrochemical Industries Ltd.
B 1: Polybutene ®-1 M8010, manufactured by Shell Chemical Co.
C 1: Arkon ® P-125, manufactured by Arakawa Chemical Co., Ltd.

TABLE 2

| Sample No. | Mixing Proportion, t % | | | Shape of S-S curve (See FIG. 1) |
|---|---|---|---|---|
| | A 1 | B 1 | C 1 | |
| 1 | 100 | — | — | ⓐ |
| 2 | 80 | 20 | — | ⓑ |
| 3 | 70 | 30 | — | ⓒ |
| 4 | 70 | 20 | 10 | ⓓ |
| | A 2 | B 1 | C 1 | |
| 5 | 70 | 20 | 10 | ⓔ |

| Sample No. | Compre- hesive rating of cold-stretch- ability | Mixing Proportion, t % | | | | |
|---|---|---|---|---|---|---|
| | | Initial stress | Magni- tude of yield value | Stabil- ity of curve | Elonga- tion at break | Trans- par- ency |
| 1 | x | x | x | x | Δ | ⊚ |
| 2 | x | x | Δ | x | Δ | x |
| 3 | Δ | Δ | Δ | ○ | Δ | x |
| 4 | ⊚ | ○ | ○ | ○ | ○ | ⊚ |
| 5 | x | ○ | ○ | ○ | x | ○ |

Example Comparative Example 2

The present example comparative example shows resins (A), (B) and (C) useful in the present invention and resins not useful therein, from the viewpoint of stretchability and transparency.

The resins listed in Tables 4-1, 4-2 and 4-3 were mixed in the following proportions: resin (A): 70 wt %, resin (B): 20 wt %, resin (C): 10 wt %. Using the resulting mixtures, cast sheets of 100μ in thickness were produced in the same manner as in Example Comparative Example 1. The cast sheets were subjected by the methods described above to measurement of transparency, and a stretching test by means of a biaxial-stretcher at two temperatures of 55° C. and 80° C. The results obtained are shown in Table 5 together with the combinations of resins. The comprehensive rating of the stretchability at 55° C. and that of the stretchability at 80° C. are shown in Table 5 according to the rating method described above.

In addition, for simplifying conclusions based on the results of evaluating the stretchability at 55° C., the stretchability at 80° C. and the transparency, the comprehensive rating of all of them is also shown in Table 5, for supplementary explanation. The rating (symbol) shown in Table 5 was as follows:

⊚: ⊚ in all of the items.
○: ○ in one or more items, and ⊚ in the other item(s).
Δ: Δ in one or more items, and ⊚ or ○ in the other item(s).
x: x in one or more items.

Putting all of the results together, it can be seen that compositions using as resin (A) a resin consisting mainly of propylene (having 3 carbon atoms) units (sample Nos. 6 to 13) are excellent in both stretchability and transparency and hence are desirable. In particular, compositions using a random copolymer as resin (A) (sample Nos. 7, 8 and 12) have a low initial stress and are the most suitable for low-temperature stretching. On the other hand, compositions using a resin consisting mainly of ethylene (having 2 carbon atoms) units (sample No. 14) could be sufficiently stretched at 55° C. but not at 80° C. Thus, these compositions were not satisfactory. A composition using a 4-methylpentene-1 (having 6 carbon atoms) polymer (sample No. 15) was poor in stretchability and since it required a mixing and extruding temperature of 260° C. or higher because of the high melting point of the 4-methylpentene-1 resin, a discolored mixture was obtained probably because other resins were decomposed.

As to resin (B), compositions using a resin consisting mainly of butene-1 units (sample Nos. 6, 7, 8, 12 and 13) and compositions using an ethylene-α-olefin copolymer having a softening point of 95° C. or lower (sample Nos. 9, 10 and 11) are excellent in both low-temperature stretchability and transparency. In particular, compositions using a butene-1-ethylene copolymer (sample Nos. 8 and 12) and compositions using a butene-1-propylene copolymer (sample Nos. 7 and 13) are the most suitable for low-temperature stretching. On the other hand, only insufficient stretchability can be attained when there is used an ethylene-α-olefin copolymer having a softening point of 100° C. (sample No. 16), or a copolymer of ethylene and a monomer (other than an α-olefin) having a polar group, such as an ethylene-vinyl acetate copolymer (sample No. 17) or an ethylene-ethyl acrylate copolymer (sample No. 18).

As resin (C), there can be preferably used hydrogenated petroleum hydrocarbon resins (sample Nos. 6 to 10, and 13) and hydrogenated natural hydrocarbon resins (sample Nos. 11 and 12). As the natural hydrocarbon resins, terpene resins are preferable. When an atactic polypropylene is used (sample No. 19), the resulting mixed composition is poor in stretchability and a film made of the mixed composition is sticky. When a low-molecular-weight polyethylene (a polyethylene wax) is used (sample No. 21), only insufficient stretchability can be attained. Therefore, both of these resins are not desirable.

TABLE 4-1

| Abbreviation Note (2) | Resin Composition |
|---|---|
| A 3 | Propylene-ethylene copolymer<br>d: 0.89 g/cm$^3$, Tm: 150° C., VSP: 114° C., MFR: 8 |
| A 4 | Propylene-based random copolymer<br>d: 0.90 g/cm$^3$, Tm: 135° C., VSP: 128° C., MFR: 5 |
| A 5 | Propylene-ethylene-butene-1 random copolymer<br>(ethylene content: ca. 4 w %<br>butene-1 content: ca. 2 wt %)<br>d: 0.90 g/cm$^3$, Tm: 125° C., MFR: 8 |
| A 6 | Propylene-based block copolymer<br>d: 0.90 g/cm$^3$, VSP: 145° C., MRF: 0.5 |
| A 7 | Propylene polymer<br>d: 0.90 g/cm$^3$, Tm: 162° C., VSP: 153° C., MRF: 5.0 |
| A 8 | Acid-modified propylene-based copolymer<br>d: 0.89 g/cm$^3$, Tm: 135° C., VSP: 112° C., MRF: 5.7 |
| A 9 | Ethylene-vinyl acetate copolymer<br>(vinyl acetate content: 10%)<br>d: 0.93 g/cm$^3$, Tm: 95° C., VSP: 70° C., MRF: 1.0 |
| A 10 | 4-Methylpentene-1 polymer<br>d: 0.84 g/cm$^3$, Tm: 235° C., VSP: 145° C., |

Note (2):
A 3: Tafmer ® XR106L manufactured by Mitsui Petrochemical Industries Ltd.
A 4: Chisso Polypro ® FK-841, manufactured by Chisso Petrochemical Ltd.
A 5: Novolen 3520LX, manufactured by BASF A. G.
A 6: Chisso Polypro ® F3020, manufactured by Chisso Petrochemical Ltd.
A 7: Chisso Polypro ® F5083, manufactured by Chisso Petrochemical Ltd.
A 8: Admer ® QF551, manufactured by Mitsui Petrochemical Industries Ltd.
A 9: Suntec ® LD EF1010, manufactured by Asahi Chemical Industry Co., Ltd.
A 10: Polymethylpentene ® TPX MX002, manufactured by Mitsui Petrochemical Industries Ltd.

TABLE 4-2

| Abbreviation Note (3) | Resin Composition |
|---|---|
| B 2 | Butene-1-ethylene copolymer<br>(ethylene content: ca. 1 wt %)<br>d: 0.91 g/cm$^3$, Tm: 116° C., VSP: 102° C., MFR: 2.0 |
| B 3 | Butene-1-propylene copolymer<br>d: 0.90 g/cm$^3$, Tm: 75° C., VSP: 70° C., MFR: 4.0 |
| B 4 | Butene-1 polymer<br>d: 0.92 g/cm$^3$, Tm: 120° C., VSP: 110° C., MFR: 1.8 |
| B 5 | Ethylene-propylene elastomer<br>(Propylene content: ca. 20 wt %)<br>d: 0.88 g/cm$^3$, VSP: 60° C., MRF: 0.7 |
| B 6 | Ethylene-octene-1 copolymer<br>(octene-1 content: ca. 14 wt %)<br>d: 0.91 g/cm$^3$, Tm: 124° C., VSP: 91° C., MI: 3.3 |
| B 7 | Ethylene-butene-1 copolymer<br>(butene content: ca. 15 wt %)<br>d: 0.91 g/cm$^3$, Tm: 118° C., VSP: 84° C., MI: 1 |
| B 8 | Ethylene-4-methylpentene copolymer (LLDPE)<br>d: 0.92 g/cm$^3$, Tm: 122° C., VSP: 100° C., MRF: 2 |
| B 9 | Ethylene-vinyl acetate copolymer<br>(vinyl acetate content: ca. 15 wt %)<br>d: 0.94 g/cm$^3$, Tm: 90° C., VSP: 68° C., MI: 0.6 |
| B 10 | Ethylene-ethyl acrylate copolymer<br>(EA content: ca. 15 wt %)<br>d: 0.93 g/cm$^3$, VSP: 61° C., MI: 1.5 |

Note (3):
B 2: Polybutene ®-1 M8240, manufacture by Shell Chemical Co.
B 3: Polybutene ® copolymer M2481, manufactured by Mitsui Petrochemical Industries Ltd.
B 4: Polybutene ®-1 M0200, manufactured by Shell Chemical Co.
B 5: Tafmer ® P-0680, manufactured by Mitsui Petrochemical Industries Ltd.
B 6: A very low density polyethylene, ATTANE ® 4004, manufactured by Dow Chemical Co.
B 7: A very low density polyethylene, NUC FLX ® 1137, manufactured by Union Carbide Corporation
B 8: Ultzex ® 2020L, manufactured by Mitsui Petrochemical Industries Ltd.
B 9: Evatate ® H1011, manufactured by Sumitomo Chemical Co., Ltd.
B 10: NUC copolymer EEA DPDJ-6182, manufactured by Nippon Unicar Co., Ltd.

TABLE 4-3

| Abbreviation Note (4) | Resin Composition |
|---|---|
| C 2 | A cyclopentadiene-based hydrogenated petroleum resin<br>d: 1.10 g/cm$^3$, Mw: 600, Mn: 340,<br>ring and ball softening point: 125° C., BrV: 3 |
| C 3 | A hydrogenated resin of aromatic olefin polymer<br>Mw: 890, Mn: 520,<br>ring and ball softening point: 125° C.,<br>BrV: 1 or less |
| C 4 | A hydrogenated resin of hydrocarbon monomer polymer<br>Mw: 536; Mn: 388,<br>ring and ball softening point: 94° C.,<br>BrV: 1 or less |
| C 5 | A hydrogenated resin<br>Mw: 300<br>ring and ball softening point: 70° C., BrV: 60 |
| C 6 | A hydrogenated terpene resin<br>d: 1.0 g/cm$^3$, Mw: 700<br>ring and ball softening point: 125° C.,<br>BrV: 10 or less |
| C 7 | A cyclopentadiene-based hydrogenated petroleum resin<br>d: 1.1 g/cm$^3$, Mw: 650, Mn: 390<br>ring and ball softening point: 140° C., BrV: 3 |
| C 8 | An atactic polypropylene<br>ring and ball softening point: 125-155° C. |
| C 9 | A low-molecular-weight polyethylene<br>d: 0.93 g/cm$^3$, Mw: about 2000,<br>dropping point: 118-128° C. |

Note (4):
C 2: Escorez ® E5320, manufactured by Tonex Company Ltd. (Exxon Corporation)
C 3: Resin MBG36, manufactured by Rika Hercules Ltd.
C 4: Regalrez ® 1094, manufactured by Rika Hercules Ltd.
C 5: Foral ® AX, manufactured by Rika Hercules Ltd.
C 6: Clearon ® P-125, manufactured by Yasuhara Yushi Co., Ltd.
C 7: Escorez ® ECR356B, manufactured by Tonex Company Ltd. (Exxon Corporation)
C 8: Vistaron ®, manufacturd by Chiba Finechemical Ltd.
C 9: Hoechst-Wax ® PE520, manufactured by Hoechst AG

TABLE 5

| Sample No. | Resin (A) | Resin (B) | Resin (C) | Stretchability at 80° C. | Stretchability at 55° C. | Transparency | Comprehensive rating |
|---|---|---|---|---|---|---|---|
| 6  | A 3  | B 4  | C 2 | ⊙ | ○ | ⊙ | ○ |
| 7  | A 4  | B 3  | C 2 | ⊙ | ⊙ | ⊙ | ⊙ |
| 8  | A 5  | B 2  | C 3 | ⊙ | ⊙ | ⊙ | ⊙ |
| 9  | A 6  | B 5  | C 3 | ⊙ | ○ | ⊙ | ○ |
| 10 | A 7  | B 6  | C 4 | ⊙ | ○ | ○ | ○ |
| 11 | A 3  | B 7  | C 5 | ⊙ | ○ | ○ | ○ |
| 12 | A 4  | B 2  | C 6 | ⊙ | ⊙ | ⊙ | ⊙ |
| 13 | A 8  | B 3  | C 7 | ⊙ | ⊙ | ○ | ○ |
| 14 | A 9  | B 3  | C 2 | x | ○ | ⊙ | x |
| 15 | A 10 | B 5  | C 3 | x | x | x | x |
| 16 | A 4  | B 8  | C 3 | x | x | △ | x |
| 17 | A 5  | B 9  | C 4 | △ | x | ○ | x |
| 18 | A 6  | B 10 | C 6 | △ | x | △ | x |
| 19 | A 1  | B 3  | C 8 | △ | x | ○ | x |
| 20 | A 4  | B 2  | C 9 | △ | x | ⊙ | x |

Example Comparative Example 3

The present example comparative example shows preferable mixing proportions of resins from the comprehensive viewpoint of cold-stretchability (55° C. and 80° C.), transparency and heat resistance.

Using compositions prepared by mixing the resins listed in Table 1 and Tables 4-1, 4-2 and 4-3 in the proportions shown in Table 6, a stretching test at 55° C. and 80° C. by means of a biaxial-stretcher and measurement of the transparency were carried out according to the same methods as in Example Comparative Example 2. The heat resistance was measured by the method described above. The test and the measurement were additionally carried out for the sample Nos. 1, 2, 3 and 4 described in Example Comparative Example 1.

The results of the measurements of the above four items were summarized according to the rating methods described above and shown in Table 6 together with the mixing proportions employed for each composition.

Analysis of Example Comparative Example 3

The performance characteristics of the ternary blended compositions examined cannot be understood technically and systematically by reviewing the results shown in Table 6, as they are. Therefore, the present inventor analyzed the contents of resins in each composition technically.

First, the results of evaluation of the stretchability at 80° C., stretchability at 55° C., transparency, and heat resistance carried out hereinabove were comprehensively rated. The rating (symbol) shown in Table 6 was as follows:

⊙: ⊙ in all of the items.
○: ○ in one or more items, ⊙ in the other item(s).
△: △ in one or more items, ⊙ or ○ in other item(s).
x: x in one or more items.

The results of the above comprehensive evaluation are also shown in Table 6.

Thus, the present inventor tabulated the evaluation results by a unitary rating; ⊙: excellent, ○: good, △: undesirable, x: inferior. On the basis of the unitary rating, the present inventor considered the relationship between the contents of resins in each composition and the performance characteristics expressed in terms of a plurality of evaluation results.

For facilitating this analysis, there was used a regular-triangular diagram showing the proportions of components, in which the scale was as follows: at the upper vertex, the proportion of resin (A) was taken as 100 wt %; at the lower, left vertex, the proportion of resin (B) was taken as 100 wt %; and at the lower, right vertex, the proportion of resin (C) was taken as 100 wt %. The symbol of comprehensive rating of the performance characteristics of each ternary blended composition was plotted on coordinates corresponding to individual mixing ratios, whereby the relationship between the mixing proportions and the performance characteristics was investigated. The regular-triangular diagram is shown in FIG. 2.

From this diagram, it can be seen that ○ symbols are distributed while being surrounded by x symbols and △ symbols, and that ⊙ symbols are distributed inside the region bounded by the ○ symbols. It can also be seen that such distributions of the performance characteristics do not intermingle with each other but are present as separated regions.

When the coordinates of a point corresponding to a resin (A) content of a wt %, a resin (B) content of b wt % and a resin (C) content of c wt % are specified by coordinates [a, b, c], the diagram can be separated into a region inside a trapezoid drawn by joining 4 points represented by coordinates [92, 5, 3], [50, 47, 3], [50, 25, 25] and [70, 5, 25], respectively, and a region outside the trapezoid.

The present inventor investigated his hypothesis that the region inside the trapezoid is a useful range of mixing proportions for the ternary blended composition of the present invention, and the present inventor compared this hypotheses with information obtained by experiments. Consequently, the boundary of the trapezoid can be said to be important in recognizing an undesirable phenomenon due to composition.

In detail, in a region where no resin (C) is contained, there is no resin acting as plasticizer on the mixture of resin (A) and resin (B), so that the compatibility between these resins in a mixed composition is bad. When used alone, the resin (A) has a yield value and is poor in cold-stretchability. In the above region, a binary blend of the resins (A) and (B) has an insufficient transparency and is poor in cold-stretchability because it has a yield value.

In a region where no resin (B) is contained, the composition contains no flexible resin, and therefore the stress at the beginning of stretching is high and the composition is poor in cold-stretchability.

On the other hand, in a region where the content of resin (A) is less than 50% by weight and the resin (A) is not a main constituent of the ternary blended composition, the composition does not contain a sufficient amount of a rigid constituent, so that it has a low heat resistance, an insufficient elongation at break in stretching at 80° C., and a poor stretchability.

The meanings of the limits of mixing proportions of the resins are further clarified below. In the case of resin (C), there is noted a group of samples corresponding to positions substantially on the line x-y shown in FIG. 2 (sample Nos. 2, 23, 24, 4, 25, 26 and 27). In these samples, the content of resin (B) was fixed at 20 wt %, and the mixing proportions of resin (A) and resin (C) were varied. First, there is compared a group of samples corresponding to positions on the line x-y in FIG. 2 on the low resin (C) content side (sample Nos. 2, 23, 24, 4 and 25). FIG. 3 shows the transparency (haze) of these compositions in relation to the content of resin (C). The figures in FIG. 3 are sample numbers. As is clear from FIG. 3, addition of a small amount of a resin (C) improved the transparency greatly. In the region where no resin (C) is contained, the stretchability, particularly at 55° C., is not sufficient. That is, it can be seen that the lower limit of the content of resin (C) is preferably 3 wt % or more, more preferably 5 wt % or more, and that when it is less than 3 wt %, the transparency is low.

On the other hand, when there is compared a group of samples corresponding to positions on the x-y line in FIG. 2 on the high resin (C) content side (sample Nos. 26 and 27), it can be seen from Table 6 that when the content of resin (C) is too high, the heat resistance is low. That is, the upper limit of the content of resin (C) is preferably 25 wt % or less, more preferably 20 wt % or less.

From the above, it can be seen that the content of resin (C) is preferably 3 to 25 wt %, more preferably 5 to 20 wt %.

Next, in the case of resin (A) and resin (B), there is noted a group of samples corresponding to positions of the v-w line shown in FIG. 2 (sample Nos. 28, 29, 30, 31, 4, 32, 33 and 34). In these samples, the content of resin (C) was fixed at 10 wt % and the mixing proportions of resins (A) and (B) were varied. First, there is compared a group of samples on the side on which the content of resin (A) is high and the content of resin (B) is low (sample Nos. 28, 29 and 30). As shown in Table 6, a composition containing no resin (B) (sample No. 28) was poor in stretchability. A composition having a content of resin (B) of 5 wt % (sample No. 29) had an improved stretchability. A composition having a content of resin (B) or 10 wt % (sample No. 30) had a good stretchability. That is, it can be seen that the lower limit of the content of resin (B) is preferably 5 wt % or more, and more preferably 10 wt % or more, and that when the content of resin (B) is lower than 5 wt %, the stretchability is not sufficient.

On the other hand, there is compared a group of samples corresponding to positions on the v-w line in FIG. 2 on the side on which the content of resin (A) is low and the content of resin (B) high (sample Nos. 32, 33 and 34). As shown in Table 6, a composition having a content of resin (A) of 60 wt % (sample No. 32) was satisfactory, but a composition having a content of resin (A) of 50 wt % (sample No. 33) possessed somewhat deteriorated stretchability and heat resistance and a composition having a content of resin (A) of 40 wt % (sample No. 34) was poor in stretchability and heat resistance. That is, it can be seen that the lower limit of the content of resin (A) is preferably 50 wt % or more, and more preferably 60 wt % or more, and that when the content of resin (A) is less than 50 wt %, the stretchability and the heat resistance ar not sufficient.

Putting the above results together, it was judged that a composition obtained by employing mixing proportions in the range inside the trapezoid drawn by joining the points of the coordinates [92, 5, 3], [50, 47, 3], [50, 25, 25] and [70, 5, 25], namely, a composition obtained by mixing resin (A) in a proportion of not more than 92 wt % and not less than 50 wt %, resin (B) in a proportion of not less than 47 wt % and not less than 5 wt %, and resin (C) in a proportion of not more than 25 wt % and not less than 3 wt % (the sum of the proportions: 100% by weight), is suitable for obtaining the objects of the present invention.

In addition, while a composition in the range surrounded by the ⊙ symbols is considered excellent, a composition obtained by employing mixing proportions inside a trapezoid drawn by joining the points of the coordinates [85, 10, 5], [65, 35, 5], [60, 20, 20] and [70, 10, 20], namely, a composition obtained by mixing resin (A) in a proportion of not more than 85 wt % and not less than 60 wt %, resin (B) in a proportion of not more than 35 wt % and not less than 10 wt %, and resin (C) in a proportion of not more than 20 wt % and not less than 5 wt % (the total of the proportions: 100% by weight), is more preferable.

TABLE 6

| Sample No. | Resin (A) Kind | Resin (A) wt % | Resin (B) Kind | Resin (B) wt % | Resin (C) Kind | Resin (C) wt % | Stretchability 80° C. | Stretchability 55° C. | Transparency | Heat Resistance | Comprehensive rating |
|---|---|---|---|---|---|---|---|---|---|---|---|
| 1 | A 1 | 100 | — | — | — | — | Δ | X | ⊙ | ⊙ | X |
| 21 | A 4 | 92 | B 3 | 5 | C 2 | 3 | ○ | ○ | ⊙ | ⊙ | ○ |
| 22 | A 1 / A 7 | 45 / 40 | B 2 | 10 | C 3 | 5 | ⊙ | ⊙ | ⊙ | ⊙ | ⊙ |
| 2 | A 1 | 80 | B 1 | 20 | — | — | ○ | X | X | ⊙ | X |
| 23 | A 4 | 77 | B 1 | 20 | C 1 | 3 | ○ | ○ | ○ | ⊙ | ○ |
| 24 | A 3 | 75 | B 3 | 20 | C 6 | 5 | ⊙ | ⊙ | ⊙ | ⊙ | ⊙ |
| 4 | A 1 | 70 | B 1 | 20 | C 1 | 10 | ⊙ | ⊙ | ⊙ | ⊙ | ⊙ |
| 25 | A 1 | 60 | B 3 / B 4 | 10 / 10 | C 1 / C 5 | 10 / 10 | ⊙ | ⊙ | ⊙ | ⊙ | ⊙ |
| 26 | A 1 | 55 | B 1 | 20 | C 2 | 25 | ⊙ | ○ | ⊙ | ○ | ○ |
| 27 | A 1 | 50 | B 2 | 20 | C 1 | 30 | ○ | ○ | ⊙ | X | X |
| 28 | A 3 | 90 | — | — | C 2 | 10 | Δ | X | ⊙ | ⊙ | X |
| 29 | A 4 | 85 | B 3 | 5 | C 6 | 10 | ⊙ | ○ | ⊙ | ○ | ○ |
| 30 | A 5 | 80 | B 1 | 10 | C 3 | 10 | ⊙ | ⊙ | ⊙ | ⊙ | ⊙ |
| 31 | A 5 | 75 | B 2 / B 3 | 10 / 5 | C 2 | 10 | ⊙ | ⊙ | ⊙ | ⊙ | ⊙ |
| 32 | A 3 | 60 | B 2 | 30 | C 3 | 10 | ⊙ | ⊙ | ⊙ | ○ | ⊙ |
| 33 | A 1 | 50 | B 2 | 40 | C 1 | 10 | ○ | ⊙ | ⊙ | ○ | ○ |
| 34 | A 1 | 40 | B 1 | 50 | C 3 | 10 | Δ | ○ | ○ | Δ | Δ |
| 3 | A 1 | 70 | B 1 | 30 | — | — | ○ | Δ | X | ⊙ | X |
| 35 | A 3 | 70 | B 3 | 10 | C 2 | 20 | ⊙ | ⊙ | ⊙ | ⊙ | ⊙ |
| 36 | A 5 | 70 | B 2 | 5 | C 6 | 25 | ⊙ | ○ | ⊙ | ○ | ○ |
| 37 | A 3 | 70 | — | — | C 2 | 30 | ○ | X | ⊙ | Δ | X |
| 38 | A 1 | 60 | B 2 | 35 | C 1 | 5 | ⊙ | ⊙ | ⊙ | ⊙ | ⊙ |
| 39 | A 4 | 50 | B 2 | 47 | C 1 | 3 | ○ | ⊙ | ○ | ○ | ○ |
| 40 | A 1 | 50 | B 1 | 25 | C 3 | 25 | ○ | ⊙ | ⊙ | ○ | ○ |
| 41 | A 3 | 50 | B 1 | 50 | — | — | ○ | Δ | X | ○ | X |
| 42 | A 1 | 40 | B 2 | 35 | C 3 | 25 | Δ | ○ | ⊙ | X | X |

Example Comparative Example 4

The present example comparative example shows the excellent shrinkability of the blend composition used in the present invention.

Biaxially oriented films of about 10μ in thickness were produced from each resin composition prepared by using the resins listed in Table 1 and Tables 4-1, 4-2 and 4-3 in the mixing proportions described in Table 7. The production of the films was carried out in the same manner as in the measurement of heat resistance described above. In detail, a cast sheet of about 120μ in thickness was stretched by a factor of 3.5×3.5 at a predetermined temperature by means of a biaxial-stretcher, after which it was taken off and then used as a sample. The heat shrinkage percentages at 75° C., 85° C. and 95° C. of the oriented films were measured according to the method described above. The results obtained are summarized in Table 7.

Sample Nos. 43, 44 and 45 were obtained by stretching blended compositions according to the present invention.

Sample No. 46 was obtained by stretching a propylene-based random copolymer at a temperature at which its satisfactory stretching was possible. Sample No 47 was obtained by stretching a propylene homopolymer at a temperature at which its satisfactory stretching was possible.

FIG. 4 shows a graph showing the relationship between the heat shrinkage percentage of these samples and the treatment temperature. The figures in FIG. 4 show stretching temperatures.

As is clear from the above, in the case of the oriented films obtained by the use of the blended compositions according to the present invention, a very high heat shrinkage percentage can be attained at a relatively low shrinking temperature.

TABLE 7

| Sample No. | Mixing proportion Resin (A) Kind | Mixing proportion Resin (A) wt % | Mixing proportion Resin (B) Kind | Mixing proportion Resin (B) wt % | Mixing proportion Resin (C) Kind | Mixing proportion Resin (C) wt % | Stretch-ability °C. | Mixing proportion % 75° C. | Mixing proportion % 85° C. | Mixing proportion % 95° C. |
|---|---|---|---|---|---|---|---|---|---|---|
| 43 | A 1 | 75 | B 1 | 15 | C 1 | 10 | 55 | 28 | 36 | 45 |
| 44 | A 1 | 75 | B 1 | 15 | C 1 | 10 | 70 | 19 | 28 | 38 |
| 45 | A 1 | 75 | B 1 | 15 | C 1 | 10 | 85 | 15 | 23 | 32 |
| 46 | A 1 | 100 | — | — | — | — | 130 | 2 | 2 | 10 |
| 47 | A 7 | 100 | — | — | — | — | 160 | 2 | 2 | 2 |

Example 1

The present example shows what orientation the cold stretching specified in the present gives to a film, in terms of orientation release stress.

As resin (A), there was used A4 (i.e., Chisso polypro ® FK-841, manufactured by Chisso Petrochemical LTD.), the resin listed in Table 4-1 in Example Comparative Example 2. As resin (B), there was used Polybutene copolymer M3080 [a butene-1-propylene copolymer (d: 0.89, Tm: 98° C., VSP: 74° C., MI: 0.2)]manufactured by Mitsui Petrochemical industries Ltd. As resin (C), there was used C1, the resin listed in Table 1 in Example Comparative Example 1 (i.e., Arkon ® P-125, manufactured by Arakawa Chemical Co., Ltd.). These resins were mixed in the following proportions; the resin (A): 75 wt %, the resin (B): 15 wt %, the resin (C): 10 wt %. The resulting mixture was pelletized. Using the blended resin thus obtained, a biaxially oriented film of about 10μ in thickness was produced by biaxial stretching with a biaxial-stretcher in the same manner as in Example Comparative Example 4. The stretching was conducted at four temperatures of 55° C., 75° C., 85° C. and 100° C. The orientation release stress at four temperatures of the respective films thus obtained was measured by the method described above. Curves showing the production rate of orientation release stress at stretching temperatures of 55° C., 75° C., 85° C. and 100° C., respectively, were designated curves Ⓐ, Ⓑ, Ⓒ and Ⓓ, respectively. The results obtained are shown in FIG. 5.

In the case of curve Ⓒ which was obtained when the stretching temperature was substantially the same as the measuring temperature of orientation release stress, an orientation release stress close to the maximum was produced substantially simultaneously with heating (within 1 second), and thereafter (for 10 minutes) the orientation release stress did not drop significantly, namely, the curve was substantially horizontal. On the other hand, in the cases of curve Ⓐ and curve Ⓑ which were obtained when the stretching temperature was lower than the measuring temperature of orientation release stress, a maximum orientation release stress was produced substantially simultaneously with heating (within 1 second) and the stress dropped immediately (in several seconds). In the case of curve Ⓓ which was obtained when the stretching temperature was higher than the measuring temperature of orientation release stress, the orientation release stress increased gradually and did not reach a maximum immediately, i.e., within several seconds.

Thus, when the composition used in the present invention is cold-stretched at a temperature lower than its melting point, the temperature employed for stretching the film can be known by measuring a curve showing the production rate of orientation release stress of the film after stretching.

In the present example, stretching was conducted at a constant temperature, but in industrial production, stretching is often conducted while varying the stretching temperature. For example, biaxial stretching by a tubular film process is conducted with cooling with cold air or the like for stable formation of the bubble. In this case, it seems difficult to designate one temperature as the stretching temperature, but the orientation temperature defined above can be known by measuring the curve showing the production rate of the orientation release stress measured in the manner described above.

Example Comparative Example 5

The present comparative example shows laminated films obtained by using, in an inner surface layer, the composition used in the present invention which is excellent in stretchability, transparency and heat resistance, and shows the excellent practical performance of the laminated films.

In the present example comparative example, the following three methods were used for producing laminated films.

① The extruding and stretching method disclosed in Jap. Pat. Appln. Kokai (Laid-Open) No. 64-500180 (corresponding to PCT WO 87/07880). In detail, a cylindrical laminate of resins was formed by extrusion by a conventional method using a plurality of extruders and a circular laminating die; and cooled rapidly to give a cylindrical laminated tube. Then, the tube was folded and both outer surfaces of the folded tube were irradiated with an electron beam having a properly chosen penetration depth from a non-scanning electron beam irradiation apparatus, whereby electron beam crosslinking was carried out from the outer surfaces of the tube. Since the electron beam gradually decreases as it proceeds inside the thickness of the tube, the third layer is hardly subjected to irradiation, but the outer layers including the first layer and the second layer generates crosslinking due to exposure to an appropriate amount of the electron beam. The crosslinked parison tube thus obtained was introduced into a heater, uniformly heated to a suitable temperature, and then subjected to biaxial stretching by a tubular film process to form a biaxially oriented film, which was then wound up. Thus, a five-layer oriented laminated tube having crosslinked outer surfaces was produced. The irradiation was carried out with an electron beam at an accelerating voltage of 200 kv and a surface dose of 10 Mrad (100000 gray (Gy) from an Area-type electron beam irradiation apparatus manufactured by Nissin-High Voltage Co., Ltd.

②  A method which comprises forming a cylindrical laminate of resins by extrusion by a conventional method by using a plurality of extruders and a circular laminating die, cooling the same rapidly to obtain a cylindrical laminated tube, and then subjecting the tube to the stretching described in Jap. Pat. Pub. No. 61-4339. In detail, a cylindrical laminate of resins was formed by extrusion using a plurality of extruders and a circular laminating die, and cooled rapidly to give a cylindrical laminated tube. The parison tube thus obtained was introduced into a heater, uniformly heated to a suitable temperature, and then subjected to biaxial cold stretching by a tubular film process using a group of deflator rolls which were being driven. An oriented film was thus formed and then wound up, whereby an non-crosslinked 5-layer oriented laminated film was produced.

③ There was employed a method according to the extruding and stretching method described in Jap. Pat. Appln. Kokai (Laid-Open) No. 47-34565 (corresponding to U.S. Pat. No. 3,741,253). The method employed was different from the method of Jap. Pat. Appln. Kokai (Laid-Open) No. 47-34565 in that the electron beam crosslinking method disclosed in Jap. Pat. Appln. Kokai (Laid-Open) No. 64-500180 was employed in the former. That is, a non-scanning electron beam irradiation apparatus was used for electron beam irradiation, and both outer surfaces of a folded tube was irradiated with an electron beam having a properly chosen penetration depth, to carry out electron beam crosslinking from the outer surface of the tube. Care was taken not to irradiate the inner layer of the tube. In detail, a cylindrical laminate of resins was formed by extrusion by a conventional method using a plurality of extruders and a circular laminating die, and rapidly cooled to give a cylindrical laminated tube. Subsequently, the tube was folded and then subjected to crosslinking by means of an electron beam having a penetration depth properly chosen so as to prevent the electron beam from reaching the inner layer of the tube, by using a non-scanning electron beam irradiation apparatus. The tube subjected to crosslinking was passed through a coating die to laminate a resin layer on the outer surface of the tube. Layers could be further laminated thereon by repeating this coating step. Then, the parison tube thus obtained was introduced into a heater, uniformly heated to a suitable temperature, and subjected to biaxial stretching by a tubular film process to form an oriented film, which was then wound up. Thus, 4-layer and 5-layer oriented laminated films having a crosslinked intermediate layer were produced. The irradiation was carried out with an electron beam at an accelerating voltage of 200 kv and a surface dose of 10 Mrad (100000 Gy) by means of an Area-type electron beam irradiation apparatus manufactured by Nissin-High Voltage Co. Ltd.

The biaxially oriented laminated films having a layflat width of 450 mm listed in Tables 9-1, 9-2 and 9-3 were produced by the above three methods ①, ② and ③, respectively, by using the resins listed in Table 1, Tables 4-1, 4-2 and 4-3 and Tables 8-1 and 8-2. Tables 9-1, 9-2 and 9-3 show the combinations of layers of parison tubes produced by the respective methods, the operation for forming each layer, the irradiated and crosslinked state and the resin composition of each layer, stretching conditions, biaxial-stretchability by a tubular film process (evaluated by the method described above), and the average thickness and the thickness nonuniformity (measured by the method described above) of each oriented film obtained. The termnology "neck temperature" in the "stretching conditions" section means the temperature of a parison tube in a part thereof immediately before expansion of the bubble in the transverse direction. In the "draw ratio" section, BUR (blow up ratio) denotes draw ratio in the transverse direction (TD), and DDR (draw down ratio) denotes draw ratio in the machine direction (MD).

Sample Nos. 101, 102, 103, 105, 108, 109, 110 and 111 were obtained by using in an inner layer a ternary blended composition comprising a propylene-based resin as the base resin according to the present invention. In all of them, both the stretchability and the thickness uniformity were excellent. Sample Nos. 107 and 108 had an inner layer of a propylene-based resin alone. In both of them, the stretchability was low. In particular, a laminated film having a thick inner layer of the propylene-based resin (sample No. 107) could not be made into an oriented film. In the case of sample No. 108, a thin inner layer of the propylene-based resin was formed, whereby an oriented film could be obtained. Sample No. 112 was obtained by using in its inner layer a mixed composition of a propylene-based resin and a butene-1-based resin as described in Jap. Pat. Appln. Kokai (Laid-Open) No. 60-79932 (corresponding to U.S. Pat. No. 4,619,859). In this sample, the stretchability is low and the thickness nonuniformity is high. Sample No. 113 was obtained by using in its inner layer a mixed composition of a propylene-based resin, a butene-1-based resin and an atactic polypropylene as described in Jap. Pat. Appln. Kokai (Laid-Open) No. 47-34565 (corresponding to U.S. Pat. No. 3,741,253). In this sample, the stretchability is low and the thickness nonuniformity is unacceptable. Therefore, said composition is inferior to the composition of the present invention.

Of the sample films described in Tables 9-1, 9-2 and 9-3, the oriented films of sample Nos. 101 to 106 and 108 to 111 were sealed by a conventional method, whereby bags were produced. The bags produced were of two kinds, namely, bottom seal bags having a width of 450 mm and a length of 900 mm and side seal bags having a width of 100mm and a length of 200 mm. For the sealing, a continuous bag making machine manufactured by Ozeki Ironworks Ltd. was used. The conditions of heat sealing were as follows: the temperature of the top of sealing bar: 220° C., sealing time: 0.3 second.

Beef suitable for roasting (about 7 kg) was vacuum-packaged using each produced bottom seal bag by a conventional method and then showered with warm water at 5° C. to shrink the film, whereby chilled-beef packages were produced. As a vacuum packaging machine, FVM-4WII manufactured by Furukawa Mfg. Co., Ltd. was used. The conditions of impulse sealing were as follow: sealing voltage: 50 V, sealing time: 1.5 seconds, sealing temperature: 120° C. to 130° C. The sealing temperature was measured before the initiation of sealing and thereafter as occasion demanded by attaching Thermo Label ® H manufactured by Nichiyu Giken Kogyo Co., Ltd. to a heater wire to confirm that the temperature was controlled within said range. As the warm water shower system, AK shrinker manufactured by Asahi Chemical Industry Co., Ltd. was used. One hundred beef packages were produced for each sample film in the manner described above and then stored in a refrigerator at 0° C. for 24 hours. Thereafter, packages which had undergone leakage of vacuum were picked out of them and the percentage of leakage of vacuum was calculated.

On the other hand, roast pork (about 200 g) was vacuum-packaged by the use of each side seal bag and immersed in warm water at 90° C. for 10 minutes for sterilization, whereby roast pork packages were produced. The same packaging machine as described above was used. One hundred roast pork packages were produced for each sample film in the manner described above, and then stored in a refrigerator at 5° C. for 24 hours. Thereafter, packages which had undergone leakage of vacuum were picked out of them and the percentage of leakage of vacuum was calculated.

The fraction defective, i.e., the percentage showing leakage of vacuum, of the above two kinds of packages was rated. The results obtained are shown in Table 10 as "fraction non-defective". The rating (symbol) shown in Table 10 was as follows:

⊚: A percentage of leakage of vacuum of less than 2%.

○: A percentage of leakage of vacuum of less than 5% and not less than 2%.

Δ: A percentage of leakage of vacuum of less than 10% and not less than 5%.

x: A percentage of leakage of vacuum of less than 10%.

In Table 10, there are summarized for the samples listed in Tables 9-1, 9-2 and 9-3 the shrinkage percentage of the film (the heat shrinkage percentages at 75° C. and 90° C. of the whole laminated film), the shrinkage percentage of the inner layer (the heat shrinkage percentage at 90° C. of the propylene-based resin layer), the transparency of the film after shrinkage, and the fraction non-defective of packages, which were measured according to the evaluation methods described above. The shrinkage percentage of the inner layer was measured by using as a test piece an inner-large-wide seal layer composed of the stretched product of the present invention which had been carefully peeled from an oriented laminated film while coating normal heptane thereon.

Films obtained by using in an inner layer a ternary blended composition comprising a propylene-based resin as the base resin according to the present invention (sample Nos. 101, 102, 103, 105, 106, 109, 110 and 111) were excellent in shrinkage percentage and transparency, so that they made it possible to produce a tight, wrinkle-free and beautiful package and hardly caused trouble after packaging. On the other hand, a film obtained by using an ethylene-based copolymer in an inner layer (No. 104) was poor in heat resistance and oil resistance of its seal portion, was apt to undergo peeling-off of its seal portion during boiling at 90° C., and had a high defective fraction. Sample No. 108 having a thin inner layer of a propylene-based resin alone was also poor in heat resistance and oil resistance of its seal portion and had a high fraction defective. Furthermore, in the case of sample No. 108, the shrinkage percentage of the inner layer itself was low, and hence that of the whole laminated film was also low. More interestingly, since the heat shrinkage percentage of the inner layer composed of the propylene-based resin alone was lower than that of the whole laminated film, the inner layer could not conform to the shape of the whole laminated film during shrinkage, and therefore the inner layer became wavy during shrinkage, resulting in a greatly deteriorated transparency of the film after shrinkage.

As described above, the laminated films obtained by using in an inner layer the ternary blended composition comprising a propylene-based resin as the base resin according to the present invention, show only slight thickness nonuniformity because of their excellent stretchability. Since they can be cold-stretched, they have excellent low-temperature shrinkability, high transparency and sufficient heat resistance and oil resistance. Therefore, they are of great utility.

TABLE 8-1

| Abbreviation Note (5) | Resin Composition |
|---|---|
| Acid-modified EVA | Acid-modified ethylene-vinyl acetate copolymer<br>d: 0.93 g/cm$^3$, Tm: 90° C., VSP: 74° C., MI: 2.0 |
| PVDC 1 | Vinylidene chloride-vinyl chloride copolymer (vinyl chloride content: 21 wt %)<br>d: 1.68 g/cm$^3$, Tm: 143° C., Mw: 98000, Mn: 41000 |
| PVDC 2 | Vinylidene chloride-methyl acrylate (methyl acrylate content: 8.5 wt %)<br>d: 1.68 g/cm$^3$, Tm: 142° C., MW: 110000, Mn: 50000 |
| EVOH | Ethylene-vinyl alcohol random copolymer (ethylene content: 48 wt %)<br>d: 1.12 g/cm$^3$, Tm: 160° C., MI: 6.4 |

Note (5):
Acid-modified EVA: Admer ® VF500, manufactured by Mitsui Petrochemical Industries Ltd.
PVDC 1: VDC-VC Resin, Manufactured by Asahi Chemical Industry Co., Ltd.
PVDC 2: VDC-MA Resin, Manufactured by Asahi Chemical Industry Co., Ltd.
EVOH: Eval ® EP-G156, manufactured by Kuraray Co., Ltd.

TABLE 8-2

| Abbreviation | Resin (A) Kind | Resin (A) wt % | Resin (B) Kind | Resin (B) wt % | Resin (C) Kind | Resin (C) wt % |
|---|---|---|---|---|---|---|
| ABC 1* | A 1 | 70 | B 3 | 20 | C 1 | 10 |
| ABC 2 | A 4 | 85 | B 1 | 10 | C 2 | 5 |
| ABC 3 | A 8 | 80 | B 3 | 10 | C 2 | 10 |
| ABC 4 | A 1 | 60 | B 2 | 30 | C 8 | 10 |
| AB | A 5 | 70 | B 1 | 30 | — | — |
| A 1 | A 1 | 100 | — | — | — | — |
| EVA 1 | A 9 | 100 | — | — | — | — |
| EVA 2 | — | — | B 9 | 100 | — | — |
| VL 1 | — | — | B 6 | 100 | — | — |
| VL 2 | — | — | B 7 | 100 | — | — |
| LL | A 2 | 70 | B 5 | 30 | — | — |
| EVA Blend | A 1 | 10 | B 9<br>B 5 | 65<br>15 | C 1 | 10 |

*ABC 1 was obtained by adding erucic amide to the mixed composition in an amount of 0.2 wt % based on the weight of the mixed composition.

TABLE 9-1

① Group of samples produced according to the method ①

| Item | 101 | 102 | 103 | 104 | 105 |
|---|---|---|---|---|---|
| Structure of parison | | | | | |
| Outer layer 1st layer (co-extrusion) | EVA 1 120μ | EVA 1 200μ | VL 2 200μ | The same as in No. 103 | LL Blend 200μ crosslinked |
| 2nd layer (co-extrusion) | EVA 2 170μ | EVA 2 100μ | EVA 2 60μ | The same as in No. 103 | Acid-modified EVA 60μ crosslinked |
| 3rd layer (co-extrusion) | PVDC 1 70μ | PVDC 1 60μ | PVDC 2 100μ | The same as in No. 103 | EVOH 70μ Substantially Unirradiated |
| 4th layer (co-extrusion) | EVA 2 120μ | EVA 2 120μ | EVA 2 60μ | The same as in No. 103 | Acid-modified EVA 90μ Non-crosslinked |
| Inner layer 5th layer (co-extrusion) | ABC 1 240μ Non-crosslinked | ABC 1 90μ Non-crosslinked | ABC 2 200μ Non-crosslinked | VL 2 200μ Non-crosslinked | ABC 3 200μ Non-crosslinked |
| Total thickness | 720μ | 620μ | 620μ | 620μ | 620μ |
| Stretching conditions | | | | | |
| Neck temp. | 55° C. | 65° C. | 70° C. | 70° C. | 95° C. |
| Draw ratio DDR × BUR | 3 × 4 | 3 × 4 | 3 × 4 | 3 × 4 | 3 × 4 |
| Stretchability | ⊚ | ⊚ | ⊚ | ⊚ | ⊚ |
| Average film thickness | 60μ | 50μ | 51μ | 52μ | 50μ |
| Uniformity of thickness | ⊚ | ⊚ | ⊚ | ⊚ | ⊚ |

TABLE 9-2

② Group of samples produced according to the method ②

| Item | 106 | 107 | 108 | 109 |
|---|---|---|---|---|
| Structure of parison | | | | |
| Outer layer 1st layer (co-extrusion) | VL 2 60μ Non-crosslinked | The same as in No. 106 | The same as in No. 106 | ABC 1 120μ Non-crosslinked |
| 2nd layer (co-extrusion) | EVA Blend 120μ Non-crosslinked | The same as in No. 106 | The same as in No. 106 | EVA 2 120μ Non-crosslinked |
| 3rd layer (co-extrusion) | PVDC 1 60μ Non-crosslinked | The same as in No. 106 | The same as in No. 106 | PVDC 2 120μ Non-crosslinked |
| 4th layer (co-extrusion) | EVA Blend 120μ Non-crosslinked | The same as in No. 106 | EVA Blend 300μ Non-crosslinked | EVA 2 120μ Non-crosslinked |
| Inner layer 5th layer (co-extrusion) | ABC 2 240μ Non-crosslinked | A 1 240μ Non-crosslinked | A 1 60μ Non-crosslinked | ABC 1 200μ Non-crosslinked |
| Total thickness | 600μ | 600μ | 600μ | 600μ |
| Stretching conditions | | | | |
| Neck temp. | 55° C. | 55° C. | 55° C. | 65° C. |
| Draw ratio DDR × BUR | 4 × 3 | 4 × 3 | 4 × 3 | 4 × 3 |
| Stretchability | ⊚ | x | Δ | ⊚ |
| Average film thickness | 60μ | — | 50μ | 50μ |
| Uniformity of thickness | ⊚ | — | Δ | ⊚ |

TABLE 9-3 / TABLE 9-3-continued

③ Group of samples produced according to the method ③

| Item | 110 | 111 | 112 | 113 |
|---|---|---|---|---|
| Structure of parison | | | | |
| Outer layer 1st layer (co-extrusion) | EVA 1 120μ Non-crosslinked | VL 1 120μ Non-crosslinked | The same as in No. 111 | The same as in No. 111 |
| 2nd layer (co-extrusion) | None | EVA 2 60μ Non-crosslinked | The same as in No. 111 | The same as in No. 111 |
| 3rd layer (co-extrusion) | PVDC 2 120μ Non-crosslinked | PVDC 1 60μ Non-crosslinked | The same as in No. 111 | The same as in No. 111 |
| 4th layer (co-extrusion) | EVA 2 240μ Non-crosslinked | EVA 2 240μ Non-crosslinked | The same as in No. 111 | The same as in No. 111 |
| Inner layer 5th layer (co-extrusion) | ABC 1 240μ Substantially Non-crosslinked | ABC 2 120μ Substantially Non-crosslinked | AB 120μ Substantially Non-crosslinked | ABC4 120μ Substantially Non-crosslinked |
| Total thickness | 720μ | 600μ | 600μ | 600μ |
| Stretching conditions | | | | |
| Neck temp. | 90° C. | 80° C. | 80° C. | 80° C. |
| Draw ratio DDR × BUR | 3 × 4 | 3 × 4 | 3 × 4 | 3 × 4 |
| Stretchability | ⊚ | ⊚ | Δ | Δ |
| Average film thickness | 60μ | 50μ | 50μ | 50μ |
| Uniformity of thickness | ○ | ○ | x | Δ |

TABLE 10

| No. | Shrinkage percentage of film 75° C. | Shrinkage percentage of film 90° C. | Shrinkage percentage of an inner layer % | Transparency after shrinkage | Fraction non-defective after packaging beef | Fraction non-defective after packaging pork |
|---|---|---|---|---|---|---|
| 101 | 33 | 47 | — | ⊚ | ⊚ | ⊚ |
| 102 | 34 | 48 | — | ⊚ | ⊚ | ⊚ |

TABLE 10-continued

| No. | Shrinkage percentage of film 75° C. | Shrinkage percentage of film 90° C. | Shrinkage percentage of an inner layer % | Transparency after shrinkage | Fraction non-defective after packaging beef | Fraction non-defective after packaging pork |
| --- | --- | --- | --- | --- | --- | --- |
| 103 | 26 | 44 | — | ⊙ | ⊙ | ⊙ |
| 104 | 30 | 43 | — | ⊙ | ⊙ | x |
| 105 | 20 | 41 | — | ⊙ | ⊙ | ⊙ |
| 106 | 33 | 48 | 39 | ⊙ | ⊙ | ⊙ |
| 108 | 25 | 40 | 28 | x | △ | x |
| 109 | 27 | 45 | — | ⊙ | ⊙ | ⊙ |
| 110 | 17 | 34 | — | ⊙ | — | ⊙ |
| 111 | 16 | 36 | — | ⊙ | — | ⊙ |

Example Comparative Example 6

The present example comparative example shows the more excellent packaging suitability of laminated films having a crosslinked layer in addition to an inner layer of the stretched product of the present invention as compared to conventional films.

As typical examples of the laminated film having the stretched product of the present invention as an inner surface layer, three kinds of films produced in Example Comparative Example 5 were used as samples. That is, there were used sample No. 103 (a film having a crosslinked outer resin layer) listed in Table 9-1, sample No. 106 (a film having no crosslinked layer) listed in Table 9-2, and sample No. 110 (a film having a crosslinked resin layer on the inner layer side) listed in Table 9-3.

Two methods according to prior art are described below.

① The laminated film disclosed in Jap. Pat. Appln. Kokai (Laid-Open) No. 59-115844 (corresponding to U.S. Pat. No. 4,501,780), namely, a laminated film having a crosslinked resin layer on the inner layer side and an inner surface layer formed of a propylene-ethylene random copolymer. For producing this film there was employed the extruding, crosslinking and stretching method disclosed in Jap. Pat. Appln. Kokai (Laid-Open) No. 47-34565 (corresponding to U.S. Pat. No. 3,741,253).

② The laminated film disclosed in Jap. Pat. Appln. Kokai (Laid-Open) No. 58-11147 (corresponding to U.S. Pat. No. 4,391,862), namely, a laminated film having a crosslinked resin layer on the inner layer side and an inner surface layer formed of a mixture of a propylene-ethylene copolymer and a butene-1-ethylene copolymer. For producing this film, there was employed as in ① the extruding, crosslinking and stretching method disclosed in Jap. Pat. Appln. Kokai (Laid-Open) No. 47-34565 (corresponding to U.S. Pat. No. 3,741,253).

In Table 11, films produced by these two methods are shown as sample Nos. 114 and 115, respectively. Table 11 shows the combination of layers of a parison tube, the operation for forming each layer, the irradiated and crosslinked state of each layer, the resin composition of each layer, stretching conditions, biaxial-stretchability by a tubular film process (evaluated according to the method described above), and the average thickness and the thickness nonuniformity of each oriented film obtained (evaluated according to the method described above). The terminology "neck temperature" in the "stretching conditions" section means the temperature of a parison tube at a part thereof immediately before expansion of the bubble in the transverse direction. In the "draw ratio" section, BUR (blow up ratio) denotes draw ratio in the transverse direction (TD) and DDR (draw down ratio) denotes draw ratio in the machine direction (MD).

In these two kinds of films, the stretchability was low and the thickness nonuniformity was great. Thus, these films were inferior to the films obtained by the use of the composition according to the present invention.

Bottom seal bags having a width of 450 mm and a length of 900 mm were produced by sealing (using a conventional method) the three kinds of films obtained according to the present invention, i.e., sample No. 103 (a film having a crosslinked outer resin layer) listed in Table 9-1, sample No. 106 (a film having no crosslinked layer) listed in Table 9-2 and sample No. 110 (a film having a crosslinked resin layer on the inner layer side) listed in Table 9-3, and the two kinds of films obtained in accordance with prior art practice, i.e., the two kinds of films listed in Table 11. For the sealing, a continuous bag making machine manufactured by Ozeki Ironworks Ltd. was used. The conditions of heat sealing were as follows: the temperature of the top of a sealing bar: 260° C., sealing time: 0.3 second.

Smoked ham (small goods, about 10 kg) was vacuum-packaged by the use of the bags to produce processed-meat packages. For the vacuum packaging, there was used a Cryovac ® system (manufactured by Furukawa Mfg. Co., Ltd.), a rotary type vacuum packaging machine 8300-14. This packaging machine had five vacuum chambers, and one revolution of each chamber could give one vacuum package. The revolution rate was adjusted to 4 r.p.m. and the vacuum packaging was carried out at a rate of 20 packages per minute. The conditions of impulse sealing were as follows. The sealing time was 1 second and the vacuum packaging machine was used while adjusting the current for sealing so that the temperatures measured by attaching Thermo Label H manufactured by Nichiyu Giken Kogyo Co. to a heater wire should be 120°–130° C., 130°–140° C., or 140°–150° C.

The following working method was employed. The processed meat was first inserted into the bags, and these bags were sent out one after another by means of a belt conveyor without removing wrinkles and trueing up the edges of the film at the mouth of each bag. A worker skilled in packaging set the bags in the packaging machine without help while trueing up the edges of the film at the mouth of each bag. The above working conditions are severe and make the worker very busy. Usually, when vacuum packaging is carried out at a rate of 20 packages per minute, two or three workers are placed in a step before the step of setting the bags in a packaging machine, in order to true up the edges of the film at a part to be sealed, namely, at the mouth of each bag, without forming a wrinkle, and the worker who sets the bags in the packaging machine devotes himself to placing the bags at a suitable place for sealing.

One hundred packages were produced for each sample, and the analysis of defective seals formed by the vacuum packaging machine and the evaluation of seals formed thereby were carried out by the methods described above and defective packages were removed. Their defects were any of: seal elongation, seal break, pinholes and stick and none of the defects was folding.

Subsequently, the packages were immersed in warm water at 90° C. for 1 minutes to cause shrinkage, and stored in a refrigerator at 0° C. for 24 hours. Then, packages which had undergone leakage (leakage of vacuum) were picked out and the cause of the leakage was analyzed. In all of these packages, the cause of leakage was a defective seal formed by the vacuum packaging machine. In detail, it was found that the folding shown in FIG. 6 was caused in the seal formed by the vacuum packaging machine and that the folded portion was in a non-fused state. In these packages, no leakage was observed before the heat shrinkage. It is conjectured that the heat shrinkage resulted in serious deformation of the film, and that the seal in the folded portion was opened by stress accompanying the deformation.

These seal defects were put together and the suitability for sealing in each temperature range was judged therefrom for each sample. The rating (symbol) shown in Tables 12-1, 12-2, 12-3, 12-4 and 12-5 was as follows:

⊚: ⊚ in all of the items.
○: ○ in one or more items, and ⊚ in the other item(s).
Δ: Δ in one or more items: and ⊚ or ○ in the other items(s).
x: x in one or more items.

In addition, samples rated ⊚ or ○ in suitability for sealing were judged practicable, and the suitabilities for sealing in the three temperature ranges were put together and the width of sealing temperature range was judged. The rating shown in Tables 12-1, 12-2, 12-3, 12-4 and 12-5 was as follows:

⊚: ⊚ or ○ in all of the three sealing temperature ranges.
○: ⊚ or ○ in two of the sealing temperature ranges, and Δ or x in the other sealing temperature range.
Δ: ⊚ or ○ in one of the sealing temperature ranges, and Δ or x in the other sealing temperature ranges.
x: Δ or x in all the sealing temperature ranges.

The results of the above judgments are summarized in Tables 12-1, 12-2, 12-3, 12-4 and 12-5.

As is clear from these Tables, the films of samples Nos. 103, 106 and 110 of the present invention are preferable because they have a wide sealing temperature range in which certain vacuum packaging can be carried out even under severe working conditions. In particular, sample Nos. 103 and 110 having one or two crosslinked layers, respectively, are more preferred because they are free from seal elongation, seal break and pinholes. In addition, sample No. 103 having a crosslinked outer resin layer is the most preferred because it is excellent in all of the sealing temperature ranges. This excellence is due to a synergistic effect of the following two facts. When the seal layer according to the present invention is used, a folded portion of the film which has been sealed is hardly opened even when the film is shrunk (the sealing properties of the folded portion are good). Since the film during sealing receives heat at the outer surface, a heat-resistant crosslinked layer has been provided as an outer resin layer which is to be heated at a higher temperature during sealing.

On the other hand, when sample Nos. 114 and 115 produced in accordance with prior art practices are sealed at a low temperature, a folded portion thereof is difficult to seal, so that although it is fused before shrinkage, the folded portion is opened after shrinkage, resulting in loss of vacuum. When they are sealed at a high temperature, their non-crosslinked outer resin layer sticks to a sealing bar to be peeled off (stick). Thus, their suitable sealing temperature range is narrow. Sample No. 115 was not desirable because the appearance of packages obtained by using it was whitish and lusterless.

TABLE 11

| Item | Sample No. 114* | Sample No. 115* |
|---|---|---|
| Structure of parison | | |
| Outer layer | A 1 | A 1 |
| 1st layer (coating) | 150μ Non-crosslinked | 150μ Non-crosslinked |
| 2nd layer (coating) | PVDC 1 150μ Non-crosslinked | PVDC 1 150μ Non-crosslinked |
| 3rd layer (co-extrusion) | EVA 2 25μ Crosslinked | EVA 3 70μ Crosslinked |
| Inner layer | A 1 | AB 2 |
| 4th layer (co-extrusion) | 100μ Substantially non-crosslinked | 280μ Substantially non-crosslinked |
| total thickness | 600μ | 600μ |
| Stretching conditions | | |
| Neck temperature | 95° C. | 90° C. |
| Draw ratio DDR × BUR | 3 × 4 | 3 × 4 |
| Stretchability | Δ | Δ |
| Average film thickness | 50μ | 50μ |
| Uniformity of thickness | Δ | Δ |

*Note (6):
A 1: Chisso Polypro FM-821, a propylene-based random copolymer manufactured by Chisso Petrochemcial Ltd.
d: 0.90 g/cm³, Tm: 136° C., VSP: 130° C., MFR: 7
AB 2: a mixed composition of 70 wt % of resin A 1 and 30 wt % of resin B 2 mentioned below:
B 2: Polybutene-1 M8240, a butene-1-ethylene copolymer (ethylene content: about 1 wt %) manufactured by Shell Chemical Co.
d: 0.91 g/cm³, Tm: 116° C., VSP: 102° C., MFR: 2.0
EVA 2: Evatate ® H1011, an ethylene-vinyl acetate copolymer (vinyl acetate content: about 15 wt %) manufactured by Sumitomo Chemical Co., Ltd.
d: 0.94 g/cm³, Tm: 90° C., VSP: 68° C., MI: 0.6
EVA 3: Evatate ® D2011, an ethylene-vinyl acetate copolymer (vinyl acetate content: about 5 wt %) manufactured by Sumitomo Chemical Co., Ltd.
d: 0.92 g/cm³, Tm: 104°0 C., VS: 83° C., MI: 2.0
DVDC 1: VDC-VC Resin, a vinylidene chloride-vinyl chloride copolymer (vinyl chloride content: 21 wt %) manufactured by Asahi Chemical Industry Co., Ltd.
d: 1.68 g/cm³, Tm: 142° C., Mw: 110000, Mn: 50000

TABLE 12-1

Sample No. 103

| Sealing temperature | Seal break seal elongation pinholes | Stick | Folding | Suitability for sealing |
|---|---|---|---|---|
| 120–130° C. | ⊚ | ⊚ | ⊚ | ⊚ |
| 130–140° C. | ⊚ | ⊚ | ⊚ | ⊚ |
| 140–150° C. | ⊚ | ⊚ | ⊚ | ⊚ |
| Width of sealing temperature range | | | | ⊚ |

TABLE 12-2

Sample No. 106

| Sealing temperature | Seal break seal elongation pinholes | Stick | Folding | Suitability for sealing |
|---|---|---|---|---|
| 120–130° C. | ○ | ⊚ | ⊚ | ○ |
| 130–140° C. | ○ | ○ | ⊚ | ○ |
| 140–150° C. | Δ | Δ | ⊚ | Δ |
| Width of sealing temperature range | | | | ○ |

TABLE 12-3

| | Sample No. 110 | | | |
|---|---|---|---|---|
| | Seal defect | | | |
| Sealing temperature | Seal break seal elongation pinholes | Stick | Folding | Suitability for sealing |
| 120–130° C. | ⊙ | ⊙ | ⊙ | ⊙ |
| 130–140° C. | ⊙ | ○ | ⊙ | ○ |
| 140–150° C. | ⊙ | △ | ⊙ | △ |
| Width of sealing temperature range | | | | ○ |

TABLE 12-4

| | Sample No. 114 | | | |
|---|---|---|---|---|
| | Seal defect | | | |
| Sealing temperature | Seal break seal elongation pinholes | Stick | Folding | Suitability for sealing |
| 120–130° C. | ⊙ | ⊙ | x | x |
| 130–140° C. | ⊙ | ○ | △ | △ |
| 140–150° C. | ⊙ | △ | ○ | △ |
| Width of sealing temperature range | | | | x |

TABLE 12-5

| | Sample No. 115 | | | |
|---|---|---|---|---|
| | Seal defect | | | |
| Sealing temperature | Seal break seal elongation pinholes | Stick | Folding | Suitability for sealing |
| 120–130° C. | ⊙ | ⊙ | △ | △ |
| 130–140° C. | ⊙ | ○ | ○ | ○ |
| 140–150° C. | ⊙ | △ | ⊙ | △ |
| Width of sealing temperature range | | | | △ |

The propylene-based resin composition used in the present invention is excellent in cold-stretchability during production of the stretched product of the present invention and easy to stretch, and hence it is useful for producing the stretched product efficiently. A film obtained by using said composition is excellent in thickness precision, shrinkability, heat resistance and transparency. Therefore, use of an oriented film comprising the stretched product of the present invention permits production of wrinkle-free, tight and beautiful packages by shrink packaging at a low shrinking temperature, and is markedly effective in reducing defective packaging and improving high-speed processing. In addition, a barrier multilayer shrinkable film having said stretched product as its inner layer is well worth using for shrink packaging for the purpose of sterilizing shapeless oil-containing food by boiling and storing for a long period of time. Moreover, a barrier multilayer shrinkable film having said stretched product as its inner layer and having a crosslinked layer is more excellently suited for practical packaging.

What is claimed is:

1. A laminated oriented film comprising a crosslinked outer resin layer and a resin layer having sealing properties being used as an inner layer; said resin layer having sealing properties being a non-crosslinked and cold-stretched resin composed of a mixture of (A(, (B) and (C) as defined below:
   (A) a polymer consisting primarily of propylene units, in a proportion of not more than 92% by weight and not less than 50% by weight,
   (B) a polymer consisting mainly of butene-1 units, in a proportion of not more than 47% by weight and not less than 5% weight, and
   (C) a hydrogenated petroleum resin or a hydrogenated terpene resin in a proportion of not more than 35% by weight and not less than 3% by weight,
   the sum of the proportions being 100% by weight.

2. A liminated oriented film according to claim 1, which further comprises a core layer formed of a resin having gas barrier properties.

3. A laminated oriented film according to claim 1, wherein the thickness of the layer comprising the propylene-based resin composition is 10% or more of the thickness of the laminated oriented film.

* * * * *